(12) United States Patent
Gurumurthy

(10) Patent No.: US 12,217,174 B2
(45) Date of Patent: Feb. 4, 2025

(54) INTELLIGENT MESSAGING FRAMEWORK FOR VEHICLE ECOSYSTEM COMMUNICATION

(71) Applicant: Volvo Car Corporation, Gothenburg (SE)

(72) Inventor: Krishnakumar Gurumurthy, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 435 days.

(21) Appl. No.: 17/505,255

(22) Filed: Oct. 19, 2021

(65) Prior Publication Data

US 2023/0121913 A1    Apr. 20, 2023

(51) Int. Cl.
| | |
|---|---|
| *G05D 1/00* | (2024.01) |
| *G06N 3/08* | (2023.01) |
| *B60W 50/00* | (2006.01) |
| *B60W 60/00* | (2020.01) |
| *H04L 67/12* | (2022.01) |

(52) U.S. Cl.
CPC ....... *G06N 3/08* (2013.01); *B60W 2050/0083* (2013.01); *B60W 60/001* (2020.02); *B60W 2556/50* (2020.02); *B60W 2556/55* (2020.02); *H04L 67/12* (2013.01)

(58) Field of Classification Search
CPC ....................................................... G06N 3/08
See application file for complete search history.

(56) References Cited

U.S. PATENT DOCUMENTS

| | | | |
|---|---|---|---|
| 9,099,006 | B2 | 8/2015 | Mudalige et al. |
| 10,181,161 | B1 * | 1/2019 | Konrardy ......... G08G 1/096775 |
| 10,613,547 | B2 | 4/2020 | Riess et al. |
| 10,809,735 | B2 | 10/2020 | Halder |
| 10,816,348 | B2 | 10/2020 | Bansal et al. |
| 10,938,497 | B2 | 3/2021 | Parkvall et al. |
| 10,962,372 | B1 * | 3/2021 | Rao .................... G01C 21/3484 |
| 10,969,456 | B2 | 4/2021 | Kobayashi et al. |
| 10,999,331 | B1 * | 5/2021 | Marchand ........... H04L 41/0806 |
| 11,074,251 | B2 | 7/2021 | El et al. |

(Continued)

FOREIGN PATENT DOCUMENTS

| | | |
|---|---|---|
| WO | 2020/221554 A1 | 11/2020 |
| WO | 2021/172611 A1 | 9/2021 |

*Primary Examiner* — Aryan E Weisenfeld
*Assistant Examiner* — Paul W Arellano
(74) *Attorney, Agent, or Firm* — Davé Law Group, LLC; Raj S. Davé

(57) ABSTRACT

An embodiment relates to a system of a vehicle comprising a first vehicle ecosystem module comprising a first communication system and a first vehicle ecosystem unit comprising a local environment matrix, and a global governance module that is internal or external to the system, wherein the global governance module comprises a learning agent and a second communication system comprising a protocol unit, wherein the learning agent is configured to learn continuously and update rules for an outcome of the first vehicle ecosystem module when power in the vehicle is turned on, wherein the system is configured for autonomous communication between the first vehicle ecosystem unit and a second vehicle ecosystem unit, wherein the second vehicle ecosystem unit is either internal or external to the system.

20 Claims, 20 Drawing Sheets

(56) References Cited

U.S. PATENT DOCUMENTS

| | | | |
|---|---|---|---|
| 2012/0303385 A1* | 11/2012 | Darling | G16H 20/13 705/2 |
| 2014/0189796 A1* | 7/2014 | Mashimo | G06F 21/305 726/3 |
| 2015/0379225 A1* | 12/2015 | Plasse | G16H 80/00 705/2 |
| 2016/0019294 A1 | 1/2016 | Dong et al. | |
| 2017/0285641 A1 | 10/2017 | Goldman-shenhar et al. | |
| 2018/0130327 A1* | 5/2018 | Rogers | B60N 2/26 |
| 2018/0188744 A1* | 7/2018 | Switkes | B60W 10/06 |
| 2019/0045577 A1* | 2/2019 | Kim | H04W 76/50 |
| 2019/0132767 A1* | 5/2019 | Shi | H04W 28/084 |
| 2019/0234786 A1* | 8/2019 | Klicpera | G01M 3/26 |
| 2020/0077240 A1 | 3/2020 | Bansal et al. | |
| 2020/0233857 A1* | 7/2020 | Fehling | G06Q 10/10 |
| 2020/0274942 A1 | 8/2020 | Mueck et al. | |
| 2020/0278217 A1 | 9/2020 | Ahmad et al. | |
| 2020/0327426 A1 | 10/2020 | Lo et al. | |
| 2021/0011720 A1* | 1/2021 | Byrne | G06F 9/546 |
| 2021/0129865 A1 | 5/2021 | Jeong et al. | |
| 2021/0178983 A1* | 6/2021 | Daly, Jr. | G01S 17/86 |
| 2021/0191402 A1* | 6/2021 | Zhu | G05D 1/0212 |
| 2021/0291679 A1* | 9/2021 | Yu | B60L 53/36 |
| 2021/0318683 A1* | 10/2021 | Luo | G01C 21/3407 |

\* cited by examiner

| | | LOCAL ENVIRONMENT MATRIX 108 | | |
|---|---|---|---|---|
| ACTOR/VEU | OBJECTIVE | STATE | RESOURCES | VALUE FUNCTION |
| A1 | Z1(t1,t2,..tn) | Sa1,Sa2,...San | R1, R2,...Rn | y1(x1,x2,..xn) |
| A2 | Z2(t1,t2,..tn) | Sb1,Sb2,...San | R1, R2,...Rn | y2(x1,x2,..xn) |

| ACTOR/VEU | ACTION | POLICY FUNCTION |
|---|---|---|
| A1 | N1 | f1(x1,x2,..xn) |
| A2 | N2 | f2(x1,x2,..xn) |

FIG. 5B

| | ACTION TYPE | POLICY UPDATE | VALUE FUNCTION | STATE CATALOGUE | COMMUNICATION CATALOGUE |
|---|---|---|---|---|---|
| TARGET SYSTEM 1 | T1A1, T1A2... T1AN | P1 | V1 | T1S1, T1S2 ... T1AN | T1C1 |
| TARGET SYSTEM 2 | T2A1, T2A2... T2AN | P2 | V2 | T2S1, T2S2 ... T2SN | T2C2 |
| TARGET SYSTEM X | T3A1, T3A2... T3AN | P3 | V3 | T3S1, T3S2 ... T3SN | T3C3 |
| TARGET SYSTEM N | TNA1, TNA2... TNAN | P4 | VN | TNS1, TNS ... TNAN | TNCN |

FIG. 5D

| STATE-VALUE MATRIX | VALUE FUNCTION V1 | VALUE FUNCTION V2 | VALUE FUNCTION VN |
|---|---|---|---|
| STATE 1 | W1 * X1 | W1*X1 | W1*X1 |
| STATE 2 | W2 * X2 | W2*X2 | W2*X2 |
| STATE N | WN * XN | WN*XN | WN*XN |

FIG. 6

| STATE TRANSITION MATRIX | S1 | S2 | Si | SN |
|---|---|---|---|---|
| S1 | - | A1, A2 ... AN | A1, A2 ... AN | A1, A2 ... AN |
| S2 | A1, A2 ... AN | - | A1, A2 ... AN | A1, A2 ... AN |
| Si | A1, A2 ... AN | A1, A2 ... AN | - | A1, A2 ... AN |
| SN | A1, A2 ... AN | A1, A2...AN | A1, A2 ... AN | - |

FIG. 7

| STATE/SYSTEM | T1 | STATE/SYSTEM | T2 | STATE/SYSTEM | TX | STATE/SYSTEM | TN |
|---|---|---|---|---|---|---|---|
| S1 | A1,A2 ..AN | S1 | A1,A2 ..AN | S1 | A1,A2 ..AN | S1 | A1,A2 ..AN |
| S2 | A1,A2 ..AN | S2 | A1,A2 ..AN | S2 | A1,A2 ..AN | S2 | A1,A2 ..AN |
| SX | A1,A2 ..AN | SX | A1,A2 ..AN | SX | A1,A2 ..AN | SX | A1,A2 ..AN |
| SN | A1,A2 ..AN | SN | A1,A2 ..AN | SN | A1,A2 ..AN | SN | A1,A2 ..AN |

FIG. 8

| STATE FUNCTIONS | EFFICIENCY VALUE FUNCTION | SAFETY VALUE FUNCTION | COMFORT VALUE FUNCTION |
|---|---|---|---|
| MEDICAL_EMERGENCY | W1 (STATE_FUNC) *X1 | W1 (STATE_FUNC) *X1 | W1 (STATE_FUNC) *X1 |
| VEHICLE_EMERGENCY | W2 (STATE_FUNC) * X2 | W2 (STATE_FUNC) *X2 | W2 (STATE_FUNC) *X2 |
| ROUTE_ACCURACY | W1 (STATE_FUNC) * XI | WN (STATE_FUNC) *XN | WN (STATE_FUNC) *XN |
| TRAFFIC_ACCURACY | . | . | . |
| SERVICE_ASSISTANCE | . | . | . |
| FUEL_EFFICIENCY | . | . | . |
| PASSENGER_COMFORT | . | . | . |
| FUEL_LEVEL | . | . | . |
| DRIVER_ASSISTANCE | . | . | . |
| ROAD_ASSISTANCE | . | . | . |
| WEATHER_ASSISTANCE | . | . | . |
| TRANSPORT_ASSISTANCE | . | . | . |
| PARKING_ASSISTANCE | . | . | . |
| VEHICLE_MAINTENANCE | | | |
| FLEET_MODE | WN (STATE_FUNC) * XN | WN (STATE_FUNC) * XN | WN (STATE_FUNC) * XN |

FIG. 10

| STATES | ACTION TYPES TO INCREASE STATE VALUE | FUNCTION |
|---|---|---|
| MEDICAL_EMERGENCY | SOS_ALERT, VEHICLE_ALERT | S1(PASSENGER_HEALTH,COLLISION,...) |
| VEHICLE_EMERGENCY | SOS_ALERT, VEHICLE_ALERT | S2(COLLISION,VEHICLE_DISTORTION,...) |
| ROUTE_ACCURACY | ROUTE_INFO, ROUTE_UPDATE | S3(ROUTE_EST_ERROR,DETOURS,...) |
| TRAFFIC_ACCURACY | TRAFFIC_INFO, TRAFFIC_UPDATE, TRAFFIC_SEARCH | S4(TRAFFIC_MISMATCH, TRAFFIC_EST_ERROR, TRAFFIC_JAMS...) |
| SERVICE_ASSISTANCE | SERVICE_REQUEST, REPAIR_REQUEST, MAINTENANCE_REQ, DIAGNOSTICS_REQ | S5(VEHICLE_DIAGNOSTICS, VEHICLE_HEALTH_SIGNAL,BATTERY_HEALTH_SIGNAL...) |
| FUEL_EFFICIENCY | ENGINE_TUNE_REQ, FUEL_PATTERN_REQ | S6(FUEL,CHARGING_RATE, BATTERY_HEALTH,MILEAGE,...) |
| PASSENGER_COMFORT | ROAD_INFO_REQ, ROAD_QUALITY_CHECK, ROAD_MAINT_CHECK | S7(BRAKES_RATIO,ACCELERATION_RATIO, SUSPENSION_METRIC,ROAD_UNEVENNESS_REPAIRS,...) |
| FUEL_LEVEL | FUEL_REQ, FUEL_AVAILABILITY, FUEL_INFO, FUEL_CHECK | S8(FUEL_CAPACITY,FUEL_LEVEL,...) |
| DRIVER_ASSISTANCE | DRIVER_HELP, DRIVER_ASSIST, DRIVER_POLICY_INFO, DRIVER_QUALITY_REQ | S9(DRIVER_PROFILE,BRAKE_COUNTS,ACCELERATION_PROFILE,...) |
| ROAD_ASSISTANCE | ROAD_MAINT_CHECK, TOLL_CHECK, ROAD_LIGHT_CHECK,ROAD_SUPPORT_CHECK, ROAD_CAPACITY_CHECK | S10(EXTERNAL_LIGHTING, ROAD_UNEVENNESS, ROAD_SIGNS,...) |
| WEATHER_ASSISTANCE | WEATHER_CHECK(T-1, T ,T+1), WEATHER_CHECK(S-1, S ,S+1) | S11(TEMP, MOISTURE, WIND, PRECIP,...) |
| TRANSPORT_ASSISTANCE | BUS_TRANSPORT_SCHEDULE, TRAM_TRANSPORT_SCHEDULE | S12(PUBLIC_VEHICLE_SCHEDULE, EVENTS,...) |
| PARKING_ASSISTANCE | PARKING_REQ, PARKING_SCHEDULE, PARKING_SEARCH | S13(DIST_TO_DESTINATION, PARKING_SPOTS,...) |
| VEHICLE_MAINTENANCE | SERVICE_REQ_QUOTE, SERVICE_DETAIL, INSURANCE_REQ_QUOTE, INSURANCE_DETAIL | S14(LAST_SERVICE, VEHICLE_SERVICE_FREQ,...) |
| FLEET_MODE | FLEET_SYSTEM_SEARCH, FLEET_SYSTEM_REQ, FLEET_SYSTEM_RESPONSE, FLEET_SYSTEM_COMT_STATUS...) | S15(VEHICLE_FLEET_MODE,VEHICLE_FLEET_STATUS...) |

FIG. 11

| STATE/SYSTEM | VEHICLE B | STATE/SYSTEM | ROAD INFRASTRUCTURE |
|---|---|---|---|
| <ALL_STATES_DEFINED_ABOVE> | <ALL DEFINED ACTION TYPES> | ROAD_ASSISTANCE | ROAD_MAINT_CHECK, TOLL_CHECK, ROAD_SUPPORT_CHECK, ROAD_CAPACITY_CHECK |
| | | TRANSPORT_ASSISTANCE | BUS_TRANSPORT_SCHEDULE, TRAM_TRANSPORT_SCHEDULE, |

| STATE/SYSTEM | LIGHTING SYSTEM | STATE/SYSTEM | PARKING SYSTEM | STATE/SYSTEM | MOBILE SERVICING |
|---|---|---|---|---|---|
| ROAD_ASSISTANCE | ROAD_LIGHT_CHECK, | PARKING_ASSISTANCE | PARKING_REQ, PARKING_SCHEDULE, PARKING_SEARCH | SERVICE_ASSISTANCE | SERVICE_REQUEST, REPAIR_REQUEST, MAINTENANCE_REQ, DIAGNOSTICS_REQ |
| | | | | VEHICLE_EMERGENCY | SOS_ALERT, VEHICLE_ALERT |

FIG. 12

| STATE/ SYSTEM | STATE/ CHARGING SYSTEM | STATE/ SYSTEM | CITY INFORMATION | STATE/ SYSTEM | TRAFFIC CONTROL SYSTEM |
|---|---|---|---|---|---|
| FUEL_LEVEL | FUEL_REQ, FUEL_AVAILABILITY, FUEL_INFO, FUEL_CHECK | TRANSPORT_ ASSISTANCE | BUS_TRANSPORT_ SCHEDULE, TRAM_TRANSPORT _SCHEDULE, | TRAFFIC_ACCURACY | TRAFFIC_INFO, TRAFFIC_UPDATE |
| | | | | TRANSPORT_ASSISTANCE | BUS_TRANSPORT_SCHEDULE, TRAM_TRANSPORT_SCHEDULE , |

FIG. 13

| STATE/SYSTEM | MEDICAL EMERGENCY SYSTEM | STATE/SYSTEM | VEHICLE EMERGENCY SYSTEM |
|---|---|---|---|
| MEDICAL EMERGENCY | SOS_ALERT, VEHICLE_ALERT | VEHICLE EMERGENCY | SOS_ALERT, VEHICLE_ALERT |

FIG. 14

| STATE/SYSTEM | AUTO INSURANCE | STATE/SYSTEM | FLEET MANAGEMENT |
|---|---|---|---|
| VEHICLE MAINTENANCE | SERVICE_REQ_QUOTE, SERVICE_DETAIL, INSURANCE_REQ_QUOTE, INSURANCE_DETAIL | FLEET_MODE | FLEET_SYSTEM_SEARCH, FLEET_SYSTEM_REQ, FLEET_SYSTEM_RESPONSE, FLEET_SYSTEM_COM |

FIG. 15

INTELLIGENT MESSAGING FRAMEWORK FOR VEHICLE ECOSYSTEM COMMUNICATION

FIELD OF THE INVENTION

The present disclosure relates generally to a field of device communication and more particularly to a framework for next generation autonomous communication systems applicable in a vehicle ecosystem, for an intelligent, context aware and semantic communication.

BACKGROUND

State of art messaging protocols available today are Advanced Message Queuing Protocol (AMQP), Message Queuing Telemetry Transport (MQTT), Simple (or Streaming) Text Oriented Message Protocol (STOMP), MQTT-S, an is an extension of the open publish/subscribe MQTT, which are heavily used in IoT based technologies and edge networks. In most of these cases, protocols limit the device to functions more like a dumb terminal with standard interface or contract mechanism.

Existing solutions such as MQTT, MQTT-S, AMQP, STOMP limit the device expressing ability. With these technologies, device communications are non-semantic and non-context aware. Currently, there are no automotive or vehicle specific solutions to address the issue.

There is a need for frameworks and protocols to make the devices communicate in an intelligent, context aware and semantic mode.

SUMMARY

An embodiment relates to a system of a vehicle comprising a first vehicle ecosystem module comprising a first communication system and a first vehicle ecosystem unit comprising a local environment matrix, wherein the first vehicle ecosystem module comprises a first hardware component of the vehicle; wherein the system is configured for autonomous communication between the first vehicle ecosystem module and a global governance module that is internal to the system, the global governance module comprising a learning agent and a second communication system comprising a protocol unit; wherein the learning agent is configured to learn continuously and update rules for an outcome of the first vehicle ecosystem module when power in the vehicle is turned on; wherein the system is configured for autonomous communication between the first vehicle ecosystem unit and a second vehicle ecosystem unit; wherein the learning agent comprises a deep reinforcement learning module to assess a scenario; wherein the system is configured to enable a function in an autonomous mode; wherein communication between the first vehicle ecosystem unit and the second vehicle ecosystem unit is independent of a fixed protocol; and wherein the outcome of the first vehicle ecosystem unit is determined based on a decision made by the learning agent.

According to an embodiment, the first vehicle ecosystem module comprises a structural boundary.

According to an embodiment, the structural boundary of the first vehicle ecosystem module comprises road infrastructure system, cloud system, vehicle subsystem further comprising a powertrain system, a steering system, a suspension system, a fuel injection system, a braking system, a communication system.

According to an embodiment, the first vehicle ecosystem module comprises a functional boundary.

According to an embodiment, the functional boundary comprises safety systems, performance systems, energy efficiency, road management, traffic navigation, passenger comfort.

According to an embodiment, the first vehicle ecosystem module comprises a plurality of vehicle ecosystem units.

According to an embodiment, the first vehicle ecosystem module is configured to communicate with the global governance module to synchronize the local environment matrix.

According to an embodiment, the first communication system comprises a transmitter and a receiver.

According to an embodiment, the local environment matrix comprises a state, a plurality of resources, a local objective function, a local constraint function, a policy function comprising a policy learning agent, and a value function to generate the outcome based on a context, wherein the plurality of resources comprises any vehicle ecosystem unit upon which an action is taken.

According to an embodiment, the policy function comprising the policy learning agent and the value function are customizable and are configurable by an original equipment manufacturer.

According to an embodiment, the first hardware component comprises, a vehicle gateway system comprising a microcontroller, a transceiver, a power management integrated circuit, an Internet of Things device capable of transmitting one of an analog and a digital signal over one of a telephone, a communication wire and wirelessly.

According to an embodiment, the autonomous communication comprises communication over a period with minimal supervision under different scenarios.

According to an embodiment, the global governance module comprises a global environment matrix comprising a plurality of target systems, a global policy function, and a global value function, a state catalogue, a communication catalogue, a global objective function and a global constraint function.

According to an embodiment, the learning agent maps states and actions to the outcome and learns how to reach objectives.

According to an embodiment, the second communication system of the global governance module comprises a receiver and a transmitter.

According to an embodiment, the second communication system of the global governance module connects to a cloud.

According to an embodiment, the cloud comprises one of a telematics and connectivity antennae module, road infrastructure system, other vehicle connectivity module, charging infrastructure system, emergency control room, city traffic system, any other relevant electronic control unit within vehicle subsystem.

According to an embodiment, the global governance module interacts with the first vehicle ecosystem module and the cloud and determines a context from the scenario.

According to an embodiment, the global governance module orchestrates the communication between the first vehicle ecosystem unit and the second vehicle ecosystem unit.

According to an embodiment, the global governance module defines rules and sequencing of the communication between the first vehicle ecosystem unit and the second vehicle ecosystem unit.

According to an embodiment, the global governance module is configured to register a new vehicle ecosystem unit.

According to an embodiment, the global governance module is configured to de-register a new vehicle ecosystem unit.

According to an embodiment, the global governance module is configured to perceive and detect a threat.

According to an embodiment, the protocol unit facilitates the local environment matrix to synchronize to latest information in a global environment matrix of the global governance module.

According to an embodiment, the protocol unit comprises a payload content, wherein variables of a predefined message template of the payload content are filled by values of action variables and state variables.

According to an embodiment, the predefined message template comprises a message structure comprising a header, a resource, a resource type, an actor, an actor type, an action, an action type, a payload comprising an action template, an actor state value, a signature comprising actor key, wherein the actor is the first vehicle ecosystem unit performing the outcome and the resource is the first vehicle ecosystem unit on which the outcome is performed.

According to an embodiment, the protocol unit comprises a predefined meta structure wherein, a message content depends on a request content payload.

According to an embodiment, the request content payload is generated based on a pretrained model based on NLP-BERT, GPT2, GPT3 techniques.

According to an embodiment, the protocol unit comprises a message superstructure to accommodate any sub protocol structure comprising AMQP, MQTT, STOMP, Zigbee, UDS, ODX, DoIP, and OBD.

According to an embodiment, the rules of the learning agent are updated based on a global policy function and a global value function of the global governance module.

According to an embodiment, the rules of the learning agent are updated based on feedback from the outcome of the system.

According to an embodiment, the outcome is an action of the first vehicle ecosystem module which further comprises a possible chain of actions against a resource in an environment of operation, wherein the resource comprises the first vehicle ecosystem unit upon which the action is taken.

According to an embodiment, the outcome is an action and is based on a state-value function and a local objective function.

According to an embodiment, the action changes a current state of the vehicle to a new state of the vehicle.

According to an embodiment, the power in the vehicle is turned on, a mode of the vehicle comprises one of a driving mode, a reversing mode, a charging mode, and a parking mode.

According to an embodiment, the deep reinforcement learning module comprises at least one of a dynamic programming, Monte Carlo, temporal-difference, Q-learning, Sarsa, R-learning and a function approximation method.

According to an embodiment, assess comprises analyzing the outcome from various actions that transform the system in a current state to a next state, wherein a state is a continuous function, and the system moves from low valued end of spectrum state towards high valued end of spectrum state by choosing a right action type.

According to an embodiment, the scenario comprises a possible event that happens when the system interacts with elements outside of the system.

According to an embodiment, the function comprises any kind of systemic transactions which takes place between any two systems and modifies predefined states.

According to an embodiment, the autonomous mode comprises a mode that is independent and unsupervised.

According to an embodiment, a rule-based system comprises a set of facts of the scenario and a set of rules for how to deal with the set of facts comprising if and then statements, wherein the scenario is predefined in the system.

According to an embodiment, the communication comprises one of a transmitting data, an instruction, and an information between the first communication system and the second communication system, between the first vehicle ecosystem unit and the second vehicle ecosystem unit, between the first vehicle ecosystem module and the global governance module.

According to an embodiment, the protocol unit comprises rules, syntax, semantics and synchronization of communication and possible error recovery methods forming a superstructure to accommodate any sub protocol comprising AMQP, MQTT, STOMP, Zigbee, UDS, ODX, DoIP, and OBD.

According to an embodiment, the fixed protocol comprises AMQP, MQTT, STOMP, Zigbee, UDS, ODX, DoIP, OBD, and any predefined protocol standard.

According to an embodiment, the protocol unit comprises one of a hardware, a software, and a combination of hardware and software.

According to an embodiment, the learning agent evolves over time based on the outcome of the scenario.

According to an embodiment, the system is in an environment of operation wherein the environment of operation is dynamic.

According to an embodiment, the communication between the first vehicle ecosystem unit and the second vehicle ecosystem unit is configured to invoke the outcome to align a policy function which meets a local objective function and a global objective function.

According to an embodiment, the system is configured to determine the outcome in a context-aware, intelligent, and in a semantic manner.

According to an embodiment, the system further comprises a regional governance module intermediate to the first vehicle ecosystem module and the global governance module.

According to an embodiment, the protocol unit is configured to learn continually from a stream of data of the scenario.

According to an embodiment, the rules of the learning agent are updated for a protocol are based on continuous learning.

According to an embodiment, the decision is a conclusion on picking the outcome from all possible outcomes after assessing of the scenario carefully by the learning agent.

According to an embodiment, the scenario comprises the first vehicle ecosystem unit communicating with a cloud unit to identify an available set of vehicles within a regional limit for a specified amount of time and further the first vehicle ecosystem unit downloads traffic policy data, driver assistance data from a vehicle ecosystem unit upon approval.

According to an embodiment, the scenario comprises the first vehicle ecosystem unit communicating with a transport and a road infrastructure system to fetch an upfront information for a given set of destinations and routes, wherein the upfront information comprises tolls, quality of a road infrastructure, possible number of public transports interventions comprising trams, buses, trains, and information of on-going construction work.

According to an embodiment, the upfront information of the scenario comprises qualitative and quantitative data.

According to an embodiment, the scenario comprises the first vehicle ecosystem unit communicating with a local weather system to fetch early near accurate weather for a given destination and a route.

According to an embodiment, the scenario comprises the first vehicle ecosystem unit communicating with a road lighting system with a given destination and a route to fetch quantitative and qualitative data which provides better insights into decision making.

According to an embodiment, the scenario comprises the first vehicle ecosystem unit communicating with a parking system to find an available parking space for a given set of destination routes and enroute itinerary comprising information about shopping, food, and recreation.

According to an embodiment, the scenario comprises the first vehicle ecosystem unit communicating with a charging infrastructure to fetch availability of charging slots, charging speed and range.

According to an embodiment, in case of issues with the charging infrastructure, the first vehicle ecosystem unit alerts a charging central system regarding a malfunctioning of a charging station and sends diagnostics data from the charging infrastructure.

According to an embodiment, the scenario comprises the first vehicle ecosystem unit comprising a gateway unit which uses a location-based system to send an emergency alert to enroute towards a mobile vehicle service system.

According to an embodiment, the mobile vehicle service system is configured to run regular diagnostics troubleshooting against the first vehicle ecosystem unit and perform service and replacement when possible and establish a connection to emergency support system to tow the vehicle to nearest service station.

According to an embodiment, the scenario comprises the first vehicle ecosystem unit communicating with a city information center helps it to navigate to fetch a latest relevant update about a region of relevance, wherein the latest relevant update includes quantitative and qualitative data comprising public event in a particular location, traffic congestion, traffic routing due to rain, new policies, new laws, any attacks, any accidents in other parts of the region of relevance.

According to an embodiment, the first vehicle ecosystem unit is configured to operate in tandem with a location-based system to triangulate a quantitative and a qualitative data.

According to an embodiment, the scenario comprises the first vehicle ecosystem unit communicating with a public transport system and a traffic control system to fetch a data comprising real time traffic congestion in major highways, motorways and historical traffic profile and model, wherein the data helps the first vehicle ecosystem unit to make accurate decision with regards to route identification given a destination.

According to an embodiment, the scenario comprises the first vehicle ecosystem unit encounters an emergency of a passenger, wherein the first vehicle ecosystem unit communicates with ambulance vehicle system with regards to more details about the passenger.

According to an embodiment, the scenario comprises the first vehicle ecosystem unit encounters an emergency comprising a vehicle emergency, wherein the first vehicle ecosystem unit sends and receives vehicle diagnostics information to a vehicle emergency service to route mobile service stations.

According to an embodiment, the scenario comprises the first vehicle ecosystem unit encounters an emergency wherein the first vehicle ecosystem unit communicates with the second vehicle ecosystem unit for possible assistance.

According to an embodiment, the scenario comprises the first vehicle ecosystem unit encountering an emergency further a quantitative and a qualitative data is shared with an auto insurance system to avail insurance benefit and adjust a premium.

According to an embodiment, the scenario comprises the first vehicle ecosystem unit communicating with a fleet management system which will use a location based system and the fleet management system to triangulate a location of the first vehicle ecosystem unit and confirm the location with help of the second vehicle ecosystem unit which is part of a fleet wherein an owner of the vehicle of the first vehicle ecosystem unit enabled a fleet mode for additional revenue and wherein the fleet mode remains until the owner decides to withdraw based on a policy function.

Another embodiment relates to a system of a vehicle comprising a first vehicle ecosystem module comprising a first communication system and a first vehicle ecosystem unit comprising a local environment matrix, wherein the first vehicle ecosystem module comprises a first hardware component of the vehicle; wherein the system is configured for autonomous communication between the first vehicle ecosystem module and a global governance module that is external to the system, the global governance module comprising a learning agent and a second communication system comprising a protocol unit; wherein the learning agent is configured to learn continuously and update rules for an outcome of the first vehicle ecosystem module when power in the vehicle is turned on; wherein the system is configured for autonomous communication between the first vehicle ecosystem unit and a second vehicle ecosystem unit; wherein the learning agent comprises a deep reinforcement learning module to assess a scenario; wherein the system is configured to enable a function in an autonomous mode; wherein a communication between the first vehicle ecosystem unit and the second vehicle ecosystem unit is independent of a fixed protocol; and wherein the outcome of the first vehicle ecosystem unit is determined based on a decision made by the learning agent.

According to an embodiment, the first vehicle ecosystem module comprises a structural boundary, wherein the structural boundary of the first vehicle ecosystem module comprises road infrastructure system, cloud system, vehicle subsystem further comprising a powertrain system, a steering system, a suspension system, a fuel injection system, a braking system, a communication system.

According to an embodiment, the first vehicle ecosystem module is configured to communicate with the global governance module to synchronize the local environment matrix.

According to an embodiment, the deep reinforcement learning module comprises at least one of a dynamic programming, Monte Carlo, temporal-difference, Q-learning, Sarsa, R-learning and function approximation methods.

According to an embodiment, the global governance module interacts with the first vehicle ecosystem module and a cloud and determines a context from the scenario.

According to an embodiment, the global governance module orchestrates communication between the first vehicle ecosystem unit and the second vehicle ecosystem unit.

According to an embodiment, the global governance module is configured to register and to deregister a new vehicle ecosystem unit.

According to an embodiment, the protocol unit comprises a message superstructure to accommodate any sub protocol structure comprising AMQP, MQTT, STOMP, Zigbee, UDS, ODX, DoIP, and OBD.

According to an embodiment, the rules of the learning agent are updated based on a global policy function and a global value function of the global governance module.

According to an embodiment, the outcome is an action and is based on a state-value function and a local objective function, wherein the action changes a current state of the vehicle to a new state of the vehicle.

According to an embodiment, communication between the first vehicle ecosystem unit and the second vehicle ecosystem unit is configured to invoke the outcome to align a policy function which meets a local objective function and a global objective function.

Another embodiment related to a method comprising receiving communication from a first vehicle ecosystem module comprising a first vehicle ecosystem unit and a first communication system comprising a local environment matrix; assessing a scenario by a learning agent comprising a deep reinforcement learning module of a global governance module; dynamic synchronization of the local environment matrix of the first vehicle ecosystem module by communicating with the global governance module; determining an outcome of the first vehicle ecosystem unit based on a decision made by the learning agent, wherein the learning agent is configured to learn continuously and update rules for the outcome of a vehicle when power in the vehicle is turned on; and executing the outcome; wherein the method is configured for autonomous communication between the first vehicle ecosystem module and the global governance module; wherein the method is configured to enable a function in an autonomous mode; wherein the communication between the first vehicle ecosystem unit and a second vehicle ecosystem unit is independent of a fixed protocol; and wherein the outcome of the first vehicle ecosystem unit is determined based on the decision made by the learning agent.

According to an embodiment, the rules of the learning agent are updated based on a global policy function and a global value function of the global governance module.

According to an embodiment, the outcome is an action and is based on a state-value function and a local objective function, wherein the action changes a current state of the vehicle to a new state of the vehicle.

According to an embodiment, communication between the first vehicle ecosystem unit and the second vehicle ecosystem unit is configured to invoke the outcome to align a policy function which meets a local objective function and a global objective function.

According to an embodiment, the global governance module orchestrates communication between the first vehicle ecosystem unit and the second vehicle ecosystem unit.

According to an embodiment, the global governance module is configured to register and to deregister a new vehicle ecosystem unit.

Another embodiment relates to a non-transitory computer-readable medium having stored thereon instructions executable by a computer system to perform a method comprising receiving communication from a first vehicle ecosystem module comprising a first vehicle ecosystem unit and a first communication system comprising a local environment matrix; assessing a scenario by a learning agent comprising a deep reinforcement learning module of a global governance module; dynamic synchronization of the local environment matrix of the first vehicle ecosystem module by communicating with the global governance module; determining an outcome of the first vehicle ecosystem unit based on a decision made by the learning agent, wherein the learning agent is configured to learn continuously and update rules for the outcome of a vehicle when power in the vehicle is turned on; and executing the outcome; wherein the method is configured for autonomous communication between the first vehicle ecosystem module and the global governance module; wherein the method is configured to enable a function in an autonomous mode; wherein the communication between the first vehicle ecosystem unit and a second vehicle ecosystem unit is independent of a fixed protocol; and wherein the outcome of the first vehicle ecosystem unit is determined based on the decision made by the learning agent.

BRIEF DESCRIPTION OF THE FIGURES

The present disclosure is directed to various embodiments illustrated and described herein with reference to the various drawings, in which like reference numbers are used to denote like systems or assembly components, methods or algorithm steps. The illustrated components of the various systems are not necessarily drawn to scale.

FIG. 5B shows a local environment matrix detail according to an embodiment of the disclosure.

FIG. 5D shows a global environment matrix detail according to an embodiment of the disclosure.

FIG. 6 shows a state value matrix according to an embodiment of the disclosure.

FIG. 7 shows a state transition matrix according to an embodiment of the disclosure.

FIG. 8 shows a system-state-action type matrix according to an embodiment of the disclosure.

FIG. 10 shows a state-value matrix for application in various scenarios according to an embodiment of the disclosure.

FIG. 11 shows a state function along with states, action types for application in various scenarios according to an embodiment of the disclosure.

FIG. 12 shows a system-state-action transition matrix for application in various scenarios according to an embodiment of the disclosure.

FIG. 13 shows the system-state-action transition matrix for application in various scenarios according to an embodiment of the disclosure.

FIG. 14 shows the system-state-action transition matrix for application in various scenarios according to an embodiment of the disclosure.

FIG. 15 shows the system-state-action transition matrix for application in various scenarios according to an embodiment of the disclosure.

DETAILED DESCRIPTION

Figure 1A:
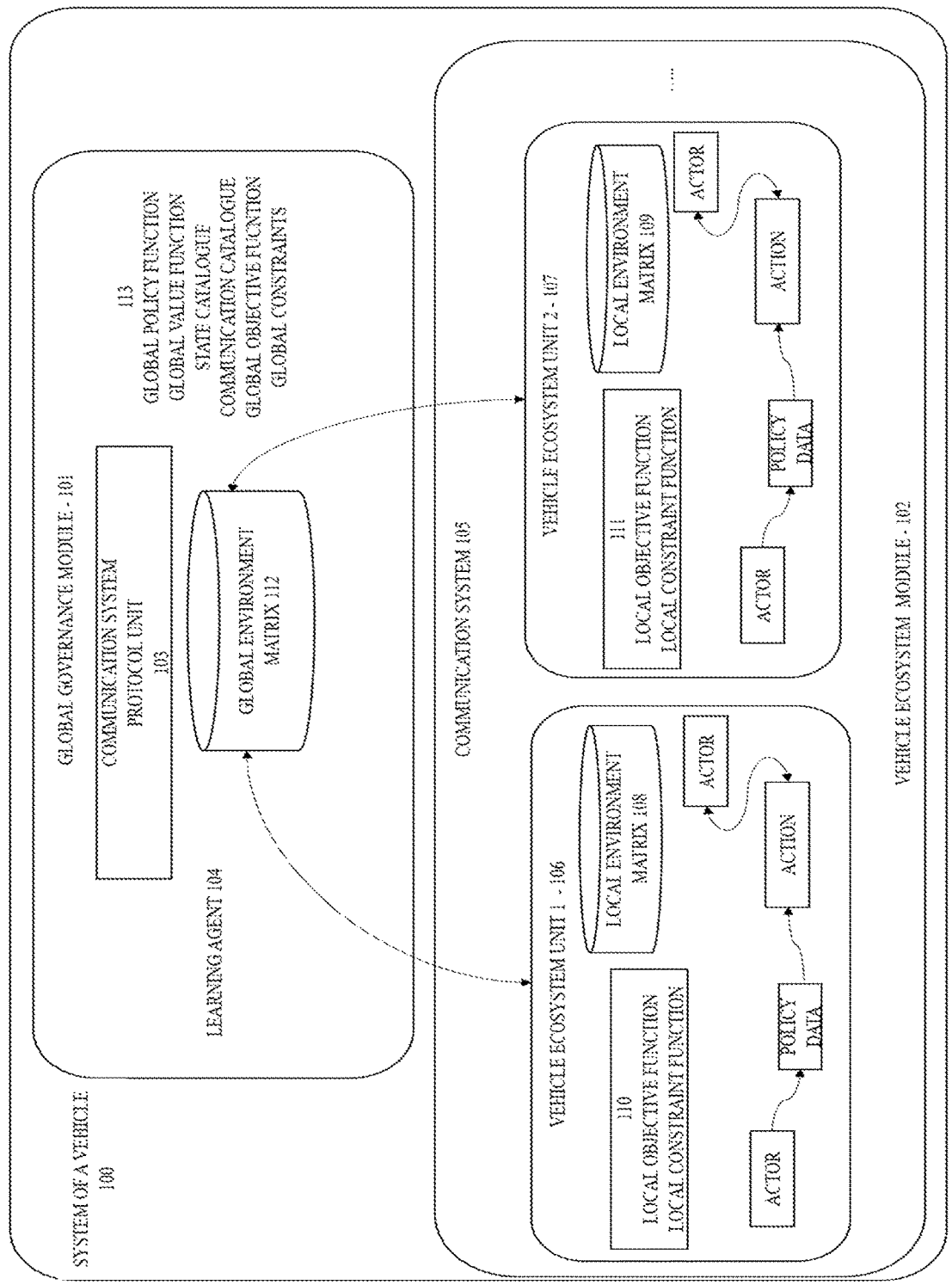
FIG. 1A shows a system of a vehicle wherein the system comprises a global governance module that is internal to the system according to an embodiment of the disclosure.

For simplicity and clarity of illustration, the drawing figures illustrate the general manner of construction, and descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same element.

Although the following detailed description contains many specifics for the purpose of illustration, a person with ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only and is not intended to be limiting.

Unless otherwise defined herein, scientific and technical terms used in connection with the present invention shall have the meanings that are commonly understood by those with ordinary skill in the art. Further, unless otherwise required by context, singular terms shall include pluralities and plural terms shall include the singular. Generally, nomenclatures used in connection with the invention described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The terms "first," "second," "third," and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

No element, act, or instruction used herein should be construed as critical or essential unless explicitly described as such. Furthermore, as used herein, the term "set" is intended to include items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks, or solid-state disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., Erasable Programmable Read-Only Memory (EPROM), Electronically Erasable Programmable Read-Only Memory (EEPROM), and flash memory devices; magnetic disks, e.g., internal hard disks or removable disks; magneto optical disks; and Compact Disc Read-Only Memory (CD ROM) disks, Digital Versatile Disk-Read Only Memory (DVD-ROM) disks and solid state disks. The processor and the memory may be supplemented by, or incorporated in, special purpose logic circuitry.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back end, middleware, or front-end components. The components of the system may be interconnected by any appropriate form or medium of digital data communication, e.g., a communication network. Examples of communication networks include a Local Area Network (LAN) and a Wide Area Network (WAN), e.g., the Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or acts described. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The foregoing disclosure provides illustration and description but is not intended to be exhaustive or to limit the implementations to the precise form disclosed. Modifications and variations are possible in light of the above disclosure or may be acquired from practice of the implementations.

Definitions and General Techniques

The following terms and phrases, unless otherwise indicated, shall be understood to have the following meanings.

As used herein, the term "IoT" stands for Internet of Things which describes the network of physical objects "things" or objects that are embedded with sensors, software, and other technologies for the purpose of connecting and exchanging data with other devices and systems over the internet.

As used herein "Machine learning" refers to algorithms that give a computer the ability to learn without being explicitly programmed including algorithms that learn from and make predictions about data. Machine learning algorithms include, but are not limited to, decision tree learning, artificial neural networks (ANN) (also referred to herein as a "neural net"), deep learning neural network, support vector machines, rule-based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming.

Statistical modeling relies on finding relationships between variables (e.g., mathematical equations) to predict an outcome.

As used herein, the term "Data acquisition" is the process of sampling signals that measure real world physical conditions and converting the resulting samples into digital numeric values that can be manipulated by a computer. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Stand-alone data acquisition systems are often called data loggers.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "Sensor" is a device that measures physical input from its environment and converts it into data that can be interpreted by either a human or a machine. Most sensors are electronic (the data is converted into electronic data), but some are simpler, such as a glass thermometer, which presents visual data.

The term "vehicle ecosystem" as used herein refers to an entire group of systems around a vehicle. A unit refers to a particular system or a subsystem within a particular system.

The term "vehicle ecosystem unit (VEU)" as used herein refers to a system or unit in the vehicle ecosystem. Examples include a vehicle (unit/system), an infrastructure (unit/system), etc. It may also refer to a subsystem as a unit within the system as a fuel injection system/unit or braking system/unit. A vehicle ecosystem unit comprises state information, policy and value databases and works towards maximizing objectives or goals limited by constraint functions. Vehicle ecosystem unit is also referred to as an "actor" when an action is performed by it; as a "resource" when an action is performed on it; and as a "target system" when it is identified as an actor or a resource by a governance module.

The term "vehicle" as used herein refers to a car, an automobile, or any transport vehicle interacting with the environment and having a scope for autonomous communication.

The term "environment" as used herein refers to surroundings and the space in which a vehicle is navigating. It refers to dynamic surroundings in which a vehicle is navigating.

The term "vehicle ecosystem module" as used herein refers to a module comprising at least a vehicle ecosystem unit and a communication module.

The term "communication system" as used herein refers to a system which describes the information exchange between two points. The process of transmission and reception of information is called communication. The major elements of communication are the transmitter of information, channel or medium of communication and the receiver of information.

The term "local environment matrix" as used herein refers to any information related to an environment of a system stored in a vehicle ecosystem module or vehicle ecosystem unit in a structured form.

The term "autonomous communication" as used herein comprises communication over a period with minimal supervision under different scenarios and is not solely or completely based on pre-coded scenarios or pre-coded rules or a predefined protocol. Autonomous communication, in general, happens in an independent and an unsupervised manner.

The term "governance module" as used herein forms a superstructure for orchestrating communication between vehicle ecosystem units.

The term "learning agent" as used herein comprises learning algorithms comprising deep reinforcement learning methods. The learning agent evolves over a time based on decisions made for an outcome in a scenario.

The term "protocol unit" as used herein is a part of a governance module which defines the rules and sequencing of communication structure between various types of actors or resources. It further comprises state, policy function and value function. It works in association with a learning agent, wherein the learning agent learns and acts in accordance with policy and value function.

The term "outcome" as used herein comprises an action of a vehicle ecosystem module which further comprises a possible chain of actions against a wherein the resource comprises any vehicle ecosystem unit upon which the action is taken.

The term "scenario" as used herein comprises a possible event that may happen when a system interacts with elements outside of the system i.e., environment.

The term "function" as used herein represents any kind of systemic transaction which takes place between the systems and modifies the predefined state(s).

The term "autonomous mode" as used herein refers to an operating mode which is independent and unsupervised.

The term "vehicle ecosystem" as used herein refers to an entire group of systems around a vehicle including systems within the vehicle with which information exchange happens.

The term "rule-based system" as used herein comprises a set of facts of a scenario and a set of rules for how to deal with the set of facts comprising if and then statements, wherein the scenario is predefined in a system.

The term "protocol" as used herein refers to a strict procedure required to initiate and maintain communication; a formal set of conventions governing the format and relative timing of message exchange between two communications terminals; a set of conventions that govern the interaction of processes, devices, and other components within a system; a set of signaling rules used to convey information or commands between boards connected to the bus; a set of signaling rules used to convey information between agents; a set of semantic and syntactic rules that determine the behavior of entities that interact; a set of rules and formats (semantic and syntactic) that determines the communication behavior of simulation applications; a set of conventions or rules that govern the interactions of processes or applications within a computer system or network; a formal set of conventions governing the format and relative timing of message exchange in a computer system; a set of semantic and syntactic rules that determine the behavior of functional units in achieving meaningful communication; a set of semantic and syntactic rules for exchanging information.

The term "communication" as used herein refers to data transmission, electric systems, telecommunications, The transmission of information from one point to another by means of electromagnetic waves. It is also a flow of information from one point, known as the source, to another, the receiver. Communication comprises one of the following: transmitting data, instructions, and information or a combination of data, instructions, and information.

Communication happens between any two communication systems or communicating units.

The term "actor types" as used herein refers to types of actors or resources such as road infrastructure actor, cloud actor, vehicle subsystem actor or road infrastructure resource, etc.

The term "action" as used herein refers to any transaction which changes the state of the actor unit. For example, applying brakes is an action, fetching information about traffic is an action, querying resources available is an action. Actors perform actions on resources, wherein actors and resources are units or systems which are part of the vehicle ecosystem.

The term "action type" as used herein refers to various transactions put into categories. For example, "alert" is an action type for any action that needs to be performed in that category.

The term "resource" as used herein refers to a system or unit which is being acted upon or a system or unit on which an action is performed.

The term "resource types" as used herein refers to vehicle ecosystem units categorized into groups based on their function. For example, all systems that provide location information services may be categorized as "location services"; all systems that provide weather information services may be categorized as "weather services," etc.

The term "value function" as used herein refers to functions of states (or of state-action pairs) that estimate how good it is for the agent to be in a given state (or how good it is to perform a given action in a given state). The notion of "how good" here is defined in terms of future rewards that can be expected, or to be precise, in terms of expected return. Of course, the rewards the agent can expect to receive in the future depend on what actions it will take. Accordingly, value functions are defined with respect to particular policies.

The term "policy function" as used herein is a strategy that an agent uses in pursuit of goals. The policy dictates the actions that the agent takes as a function of the agent's state and the environment. The policy function maps states to actions. So, basically, a policy function says what action to perform in each state. The system goal lies in finding the optimal policy which specifies the correct action to perform in each state, which maximizes the reward.

The term "objective function" as used herein is an equation or a function with input variables and whose output value may represent a cost of the input. Objective function is usually maximized or minimized, meaning that, a search is performed for a candidate solution that moves the system towards highest or lowest score of the objective function respectively.

The term "constraint function" as used herein is a function that expresses a prescribed relation among variables of a system and is a condition of an optimization problem or a dependency of variables in the system that the solution must satisfy.

The term "message structure" as used herein refers to a structure of a communication message when a query and fetch operation happens. It comprises payload and header where payload is the quantitative value of the information that is shared, and header refers to what information is being shared. The message structure acts as a superstructure to accommodate any sub protocol structure such as AMQP, MQTT, Zigbee, etc.

The term "vehicle gateway system" as used herein refers to a device that connects two systems that use different protocols. It is a system which takes care of any outbound or inbound communications between any two vehicle ecosystem units.

For device communication, currently there are problem specific protocols like Unified Diagnostic Services (UDS), Open Diagnostic eXchange format (ODX), Diagnostics Over Internet Protocol (DoIP), On-Board Diagnostics (OBD), etc., in addition to general purpose messaging protocols like MQTT, AMQP, STOMP, ZigBee, etc. Invention described herein addresses some concerns with the existing technologies and how to enable next generation vehicle to everything (V2X) semantic communication in a more context aware and dynamic manner. This would help the vehicle to be autonomous not just in functioning but in communication with other vehicles, humans, grids, central clouds, and infrastructures. This enables next generation Vehicle to everything (V2X) semantic communication in a more context aware and dynamic manner. V2X communication technology includes but not limited to Vehicle-to-Infrastructure (V2I), Vehicle-to-Network (V2N), Vehicle-to-Vehicle (V2V), Vehicle-to-Grid (V2G), Vehicle-to-Device (V2D) and Vehicle-to-Pedestrian (V2P), etc.

This invention presents a novel method of communication between any two Vehicle Ecosystem Units (VEUs) in a context-aware and intelligent manner rather than existing rule-based systems. It utilizes deep reinforcement learning techniques in V2X and it utilizes deep reinforcement learning techniques within vehicle communications. Here, VEU has a localized version of the environment matrix which comprises a value function and a policy function for any given state and possible line of actions against any set of resources in an environment it operates.

Global Governance Module Internal to the System:

In an embodiment, it is a system of a vehicle comprising a first vehicle ecosystem module comprising a first communication system and a first vehicle ecosystem unit comprising a local environment matrix, wherein the first vehicle ecosystem module comprises a first hardware component of the vehicle, the system is configured for autonomous communication between the first vehicle ecosystem module and a global governance module that is internal to the system, the global governance module comprising a learning agent and a second communication system comprising a protocol unit, wherein the learning agent is configured to learn continuously and update rules for an outcome of the first vehicle ecosystem module when power in the vehicle is turned on, wherein the system is configured for autonomous communication between the first vehicle ecosystem unit and a second vehicle ecosystem unit, wherein the second vehicle ecosystem unit is either internal or external to the system, wherein the learning agent comprises a deep reinforcement learning module to assess a scenario, wherein the system is configured to enable a function in an autonomous mode optionally without a rule-based system, wherein the rule-based system does not include the learning agent, wherein optionally there is no fixed protocol for a communication between the first vehicle ecosystem unit and the second vehicle ecosystem unit, such that the communication between the first vehicle ecosystem unit and the second vehicle ecosystem unit is independent of a fixed protocol and the first vehicle ecosystem unit and the second vehicle ecosystem unit communicate even if the first vehicle ecosystem unit and the second vehicle ecosystem unit have not agreed to a protocol before the communication and wherein the outcome of the first vehicle ecosystem unit is determined based on a decision made by the learning agent.

FIG. 1A shows a system of a vehicle 100 according to an embodiment, wherein the system comprises a global governance module 101 internal to the system and a vehicle ecosystem module 102. The global governance module comprises a communication system comprising a protocol unit 103 and a learning agent 104. The vehicle ecosystem module 102 comprises a communication system 105 and a first vehicle ecosystem unit 106 comprising a local environment matrix 108, a local objective function and a local constraint function 110, a second vehicle ecosystem unit 107 comprising a local environment matrix 109, a local objective function and a local constraint function 111.

In an embodiment, the first vehicle ecosystem module comprises one or more vehicle ecosystem units.

In an embodiment, the system comprises the plurality of vehicle ecosystem units. In an embodiment, the first communication system comprises a transmitter and a receiver. The system is configured for autonomous communication between the vehicle ecosystem module 102 and a global governance module 101. The global governance module comprising the learning agent 104 is configured to learn continuously and update rules for an outcome of the first vehicle ecosystem module when power in the vehicle is turned on. The system is configured to determine an outcome in a context-aware, intelligent, and semantic manner.

According to an embodiment, the autonomous communication comprises communication over a period with minimal supervision under different scenarios.

According to an embodiment, autonomous communication is not based on pre-coded scenarios or pre-coded rules or a predefined protocol.

According to an embodiment, an outcome comprises an action of a vehicle ecosystem module which may further comprises a possible chain of actions against a resource in an environment of operation, wherein the resource comprises any vehicle ecosystem unit upon which the action is taken.

According to an embodiment, the scenario comprises a possible event that may happen when the system interacts with elements outside of the system.

Figure 1B:
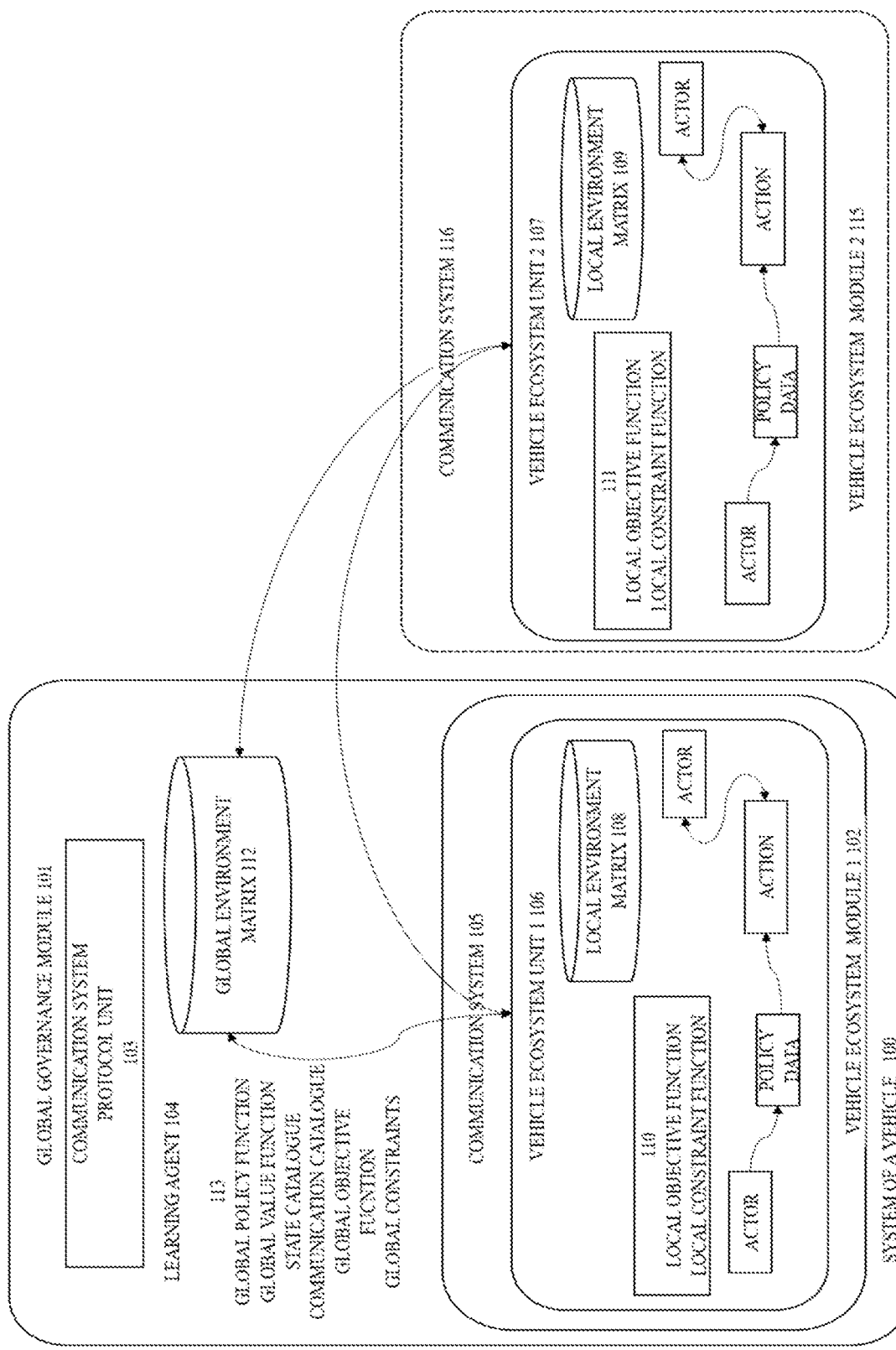
FIG. 1B shows the system of the vehicle wherein the system comprises the global governance module that is internal to the system and a vehicle ecosystem module that is external of the system according to an embodiment of the disclosure.

The second vehicle ecosystem unit may be internal to the system as shown in FIG. TA or external to the system as shown in FIG. 1B. In an embodiment, the system is configured to comprise a plurality of vehicle ecosystem units both internal and external to the system.

In an embodiment, a vehicle ecosystem module comprises a first hardware component comprising a vehicle gateway system comprising microcontrollers, transceivers, power management integrated circuits, an Internet of Things (IoT) device capable of transmitting an analog or digital signal over a telephone, a communication wire, or wirelessly. The system is configured for autonomous communication between a first vehicle ecosystem unit and a second vehicle ecosystem unit and between a first vehicle ecosystem unit and a global governance module.

In an embodiment, a protocol unit facilitates a local environment matrix of a vehicle ecosystem unit to synchronize to the latest information in a global environment matrix of the global governance module.

According to an embodiment, the vehicle ecosystem module is configured to communicate with the global governance module to synchronize the local environment matrix. A protocol unit is configured to understand any protocol wherein a protocol comprises rules, syntax, semantics and synchronization of communication and possible error recovery methods forming a superstructure to accommodate any sub protocol comprising AMQP, MQTT, STOMP, Zigbee, UDS, ODX, DoIP, and OBD.

According to an embodiment, the fixed protocol comprises AMQP, MQTT, STOMP, Zigbee, UDS, ODX, DoIP, OBD, and any predefined protocol standard. A protocol is implemented by hardware, software, or a combination of hardware and software.

In an embodiment, the protocol unit comprises the learning agent and is configured to learn continually from a stream of data of the scenario.

According to an embodiment, the system is in an environment of operation which is the surrounding and dynamic environment of the vehicle.

Global Governance Module External to the System:

In an embodiment it is a system of a vehicle, comprising, first vehicle ecosystem module comprising a first communication system and a first vehicle ecosystem unit comprising a local environment matrix, wherein the first vehicle ecosystem module comprises a first hardware component of the vehicle, wherein the system is configured for autonomous communication between the first vehicle ecosystem module and a global governance module that is external to the system, the global governance module comprising a learning agent and a second communication system comprising a protocol unit, wherein the learning agent is configured to learn continuously and update rules for an outcome of the first vehicle ecosystem module when power in the vehicle is turned on, wherein the system is configured for autonomous communication between the first vehicle ecosystem unit and a second vehicle ecosystem unit, wherein the second vehicle ecosystem unit is either internal or external to the system, wherein the learning agent comprises a deep reinforcement learning module to assess a scenario, wherein the system is configured to enable a function in an autonomous mode optionally without a rule-based system, wherein the rule-based system does not include the learning agent, wherein optionally there is no fixed protocol for a communication between the first vehicle ecosystem unit and the second vehicle ecosystem unit, such that the communication between the first vehicle ecosystem unit and the second vehicle ecosystem unit is independent of a fixed protocol and the first vehicle ecosystem unit and the second vehicle ecosystem unit communicate even if the first vehicle ecosystem unit and the second vehicle ecosystem unit have not agreed to a protocol before the communication and wherein the outcome of the first vehicle ecosystem unit is determined based on a decision made by the learning agent.

Figure 2A:
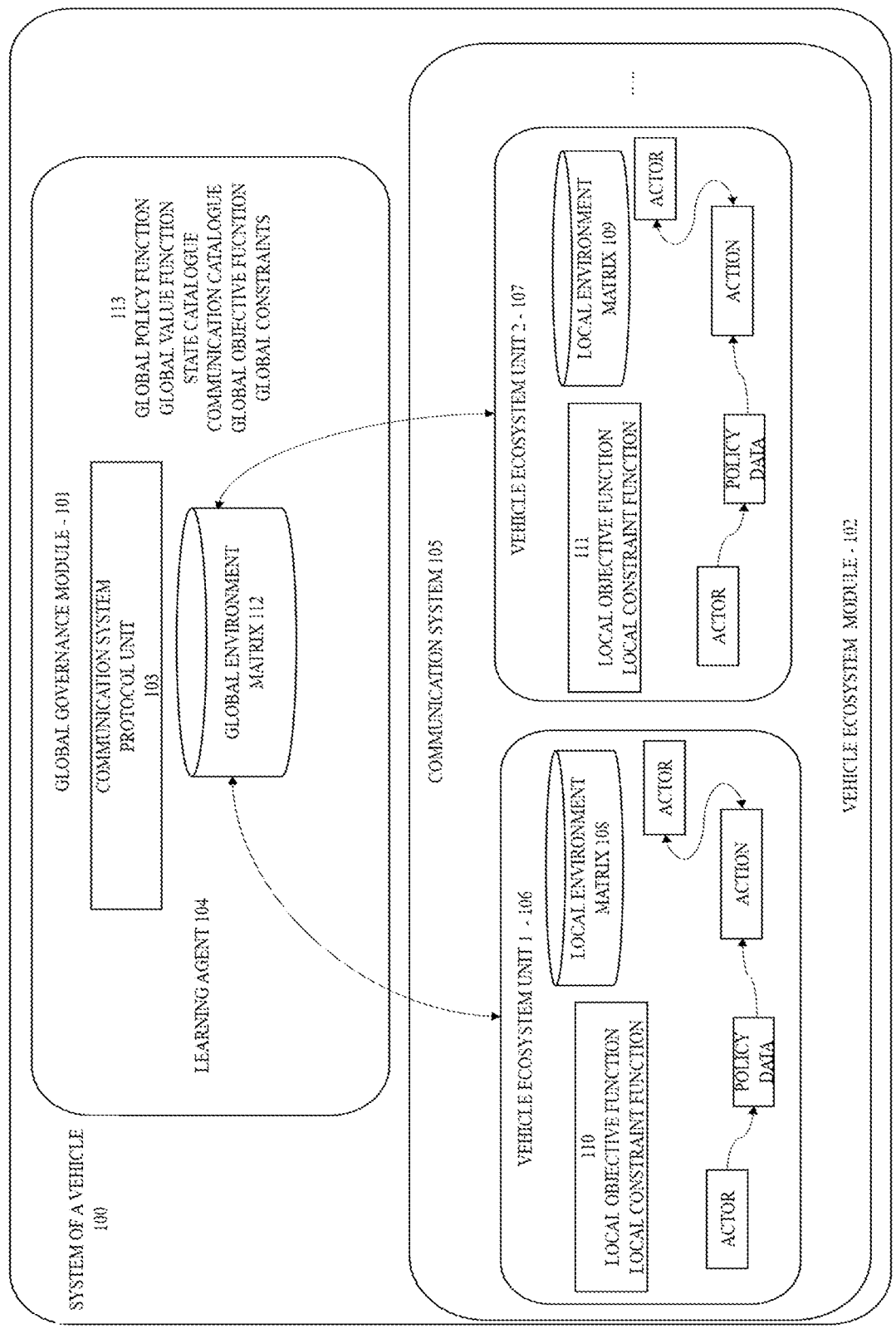
FIG. 2A shows the system of the vehicle wherein the system comprises the global governance module that is external to the system according to an embodiment of the disclosure.

FIG. 2A shows a system of a vehicle 100 according to an embodiment, wherein the system comprises a global governance module 101 external to the system and a vehicle ecosystem module 102 internal to the system. A global governance module comprises a communication system comprising a protocol unit 103 and a learning agent 104. The vehicle ecosystem module 102 comprises a communication system 105 and a first vehicle ecosystem unit 106 comprising a local environment matrix 108, a local objective function and a local constraint function 110, a second vehicle ecosystem unit 107 comprising a local environment matrix 109, a local objective function and a local constraint function 111. The system is configured to comprise the plurality of vehicle ecosystem units. The system is configured for autonomous communication between the vehicle ecosystem module 102 and a global governance module 101. The global governance module comprising the learning agent 104 is configured to learn continuously and update rules for an outcome of the first vehicle ecosystem module when power in the vehicle is turned on and continuously thereafter.

According to an embodiment, when the power in the vehicle is turned on the modes of the vehicle comprises a driving mode, a reversing mode, a charging mode, and a parking mode.

According to an embodiment, the communication comprises one of transmitting data, instructions, and information between the first communication system and the second communication system, between the first vehicle ecosystem unit and the second vehicle ecosystem unit, between the first vehicle ecosystem module and the global governance module.

Figure 2B:
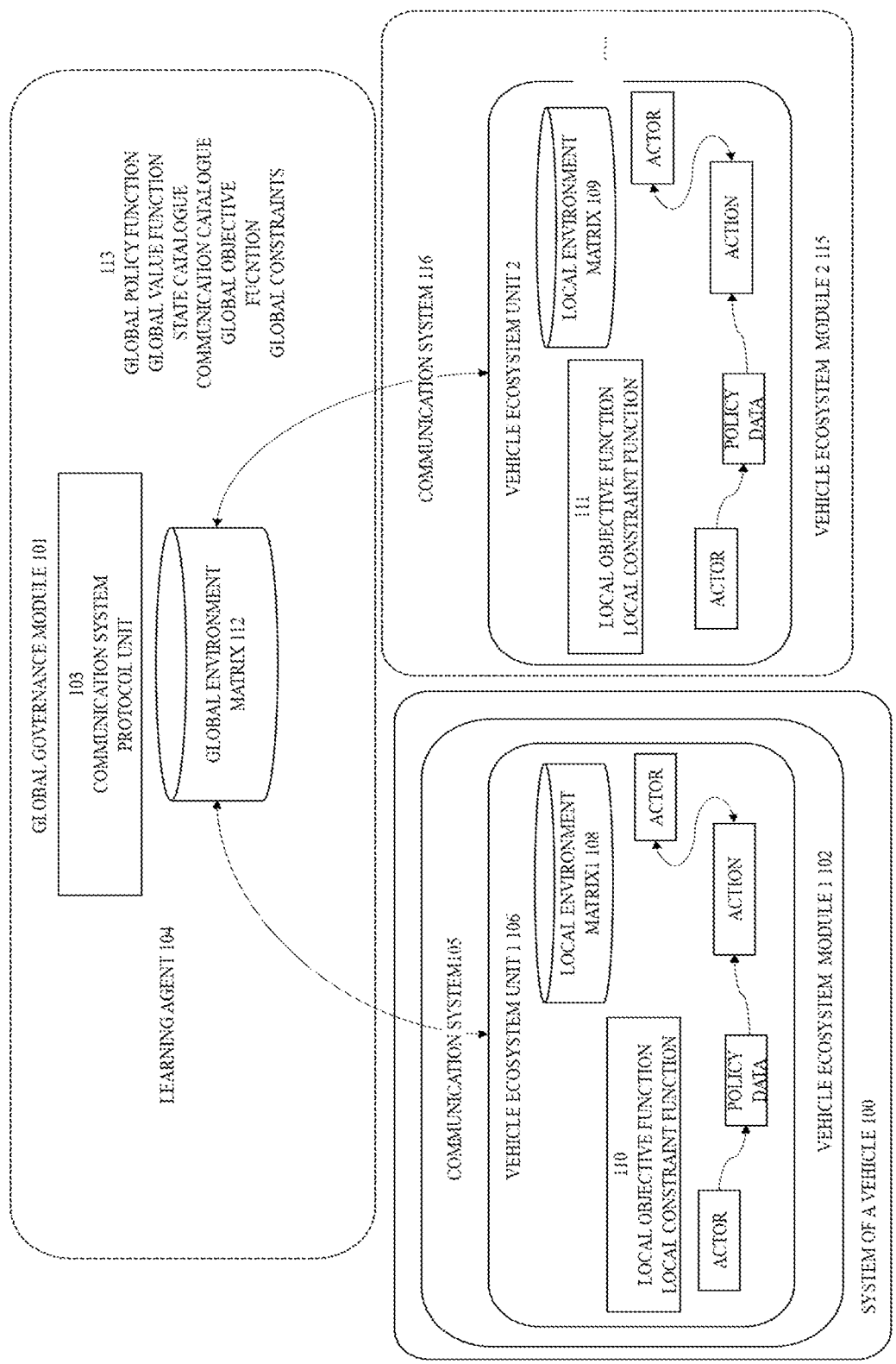
FIG. 2B shows the system of the vehicle wherein the system comprises the global governance module and the vehicle ecosystem module that is external to the system according to an embodiment of the disclosure.

The system is configured for autonomous communication between a first vehicle ecosystem unit and a second vehicle ecosystem unit, wherein the second vehicle ecosystem unit is internal to the system as shown in FIG. 2A or external to the system as shown in FIG. 2B. In an embodiment, the system is configured to comprise a plurality of vehicle ecosystem units both internal and external to the system.

The learning agent 104 of governance module, whether governance module is external to the system or internal to the system, comprises a deep reinforcement learning module to assess a scenario, wherein the system is configured to enable a function in an autonomous mode optionally without a rule-based system.

According to an embodiment, the rule-based system comprises a set of facts of the scenario and a set of rules for how to deal with the set of facts comprising if and then statements, wherein the scenario is predefined in the system.

According to an embodiment, the autonomous mode is an operating mode which is independent and unsupervised.

According to an embodiment, the deep reinforcement learning module comprises at least one of a Dynamic Programming (DP), Monte Carlo, Temporal-Difference (TD), Q-Learning (Off-policy Temporal Difference algorithm), Sarsa (State-action-reward-state-action—On-policy TD algorithm), R-Learning (learning of relative values) and Function Approximation methods (Least-Square Temporal Difference, Least-Square Policy Iteration). A rule-based system does not include the learning agent. According to an embodiment, there is no fixed rule-based outcome based on the rule-based system for any scenario between a first vehicle ecosystem unit and a second vehicle ecosystem unit or between a first vehicle ecosystem unit and a governance module.

According to an embodiment, there is no fixed rule-based outcome in such agents, and they are not based on curated rules for a scenario and wherein the learning agent evolves based on the outcome of the scenario.

A communication between the first vehicle ecosystem unit 106 and the second vehicle ecosystem unit 107 is independent of a fixed protocol. The first vehicle ecosystem unit 106 and the second vehicle ecosystem unit 107 communicate even if the first vehicle ecosystem unit 106 and the second vehicle ecosystem unit 107 have not agreed to a protocol before the communication. The outcome of the first vehicle ecosystem unit is determined based on a decision made by the learning agent. A decision is a conclusion on picking the outcome from all possible outcomes after assessing the scenario carefully by the learning agent.

Vehicle Ecosystem, Vehicle Ecosystem Units and Boundaries

Vehicle ecosystem refers to the entire group of systems around a vehicle. It includes but is not limited to the road infrastructure system, weather system, cloud system, a communication system, a vehicle as a system, vehicle's subsystems such as a powertrain system, a steering system, a suspension system, a fuel injection system, a braking system, etc. A vehicle ecosystem unit refers to a particular system or a subsystem within a particular system. According to an embodiment, every system within a vehicle ecosystem is designed to deliver a set of functions f1, f2, . . . , fn with available set of resources r1, r2 . . . rn. For example, a fuel injecting system is designed to deliver the fuel by maximizing its efficiency. Resources are vehicle ecosystem units upon which an action is performed.

System boundary can be either a functional boundary or a structural boundary or a combination of functional and structural boundary.

According to an embodiment, a vehicle ecosystem module or vehicle ecosystem unit is configurable by a original equipment manufacturer to comprise a structural boundary or a functional boundary or a combination of both.

A functional boundary is defined wherein the systems are units that are grouped based on their function. It defines functional boundary conditions of the system designed. A structural boundary is defined wherein the systems are grouped based on their physical and structural boundary. It defines the structural boundary conditions of the system designed comprising a set of resources r1, r2, . . . , rn which are part of or used by the system.

According to an embodiment, a vehicle ecosystem module comprises a structural boundary.

According to an embodiment, the structural boundary of a vehicle ecosystem module comprises road infrastructure system, cloud system, vehicle subsystem further comprising a powertrain system, a steering system, a suspension system, a fuel injection system, a braking system, a communication system.

According to an embodiment, a vehicle ecosystem module comprises a functional boundary.

According to an embodiment, the functional boundary comprises safety systems, performance systems, energy efficiency, road management, traffic navigation, passenger comfort.

System and Environment

An environment is everything in the world which surrounds the system (agent), but it is not a part of an agent itself. An environment can be described as a situation in which an agent is present. The environment is where the agent operates. Environment provides the agent with something to sense and act upon.

In the case of an autonomous car, the agent or system or vehicle ecosystem unit can be the car, and the environment corresponds to the surroundings of the vehicle in which the vehicle is navigating along with the vehicle current location in the environment. A state of the environment can be observed using a plurality of sensors such as cameras, lidars, and other sensors. The agent, i.e., the vehicle can perform navigation actions such as take a turn, increase the speed, hit the brake, or do nothing. The agent, i.e., the vehicle is rewarded for following the signals, not colliding with surrounding objects, conforming to driving regulations, maintaining passenger comfort, and staying on course. The algorithms learn to recognize pedestrians, roads, traffic, detect street signs in the environment and act accordingly. The learning agent gets trained in complex scenarios and will learn to excel in decision making skills in scenarios including minimal human deaths, best route to follow, best path to take, etc.

Figure 3:
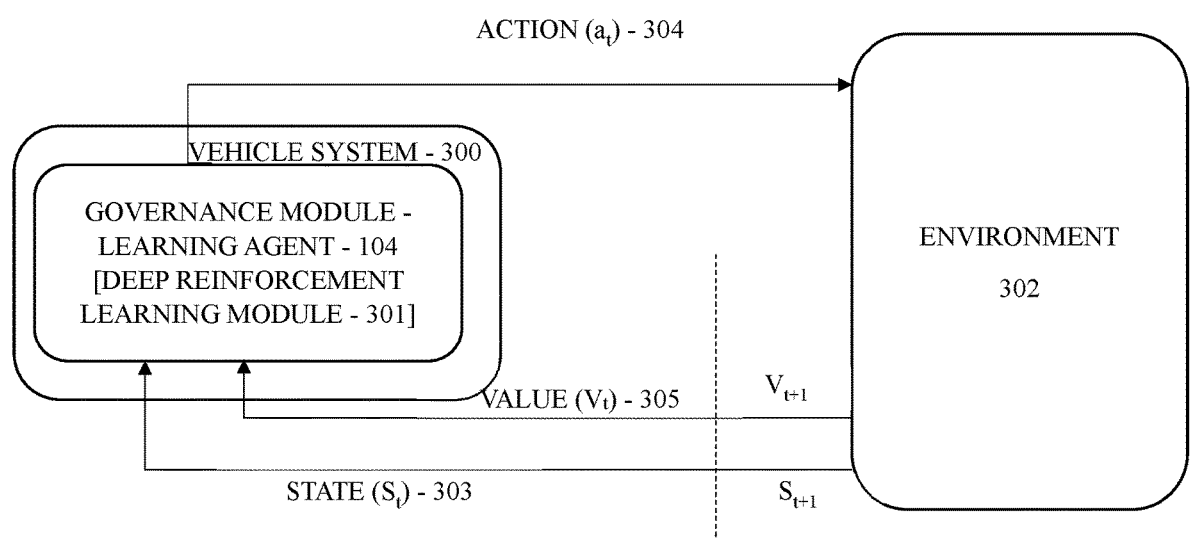
FIG. 3 shows a learning agent interacting with an environment according to an embodiment of the disclosure.

As shown in FIG. 3, a learning agent comprising deep reinforcement learning module 301 interacts with an environment 302. The environment 302 provides information about the state 303 of the system 300. The agent observes these states and interacts with the environment by taking actions 304. Actions can be discrete like stop or go, or continuous like reducing the speed of the car. These actions 304 cause the environment to transition to a new state. Based on whether the new state is relevant to the goal/objective of the system, the agent receives a reward, the reward can also be zero or negative if it moves the agent away from its goal/objective. In one embodiment, the goal is to estimate the value of a policy, that is, to learn how much total reward to expect from a policy. In other words, the goal is to estimate the state-value function of a policy. The goal of reinforcement learning is to make the agent take actions that maximize its rewards. The agent's action-making function is called a policy.

The goal of reinforcement learning is to map states to actions in a way that maximizes rewards. Different categories of learning algorithms for reinforcement learning systems are:
(a) Policy-based algorithms
(b) Value-based algorithms
(c) Model-based algorithms
(d) Combined methods Policy-based algorithms directly learn the stochastic policy function that maps state to action. Act by sampling policy. Value-based algorithms learn the state or state-action value, they act by choosing the best action in the state. Model-based algorithms learn the model of the world and then plan to use the model thus requiring the model of the world to be updated and replanned often.

Policy-based algorithms: In policy-based algorithms, a policy maps states to actions. A learning agent that learns a policy can create a trajectory of actions that lead from the current state to the objective. For example, consider an agent, a vehicle ecosystem unit, that is optimizing a policy to stop the vehicle at a red signal. First, it may take random actions like reducing the speed, reducing the fuel injection, etc. for which it receives no rewards, or the value function reduces, very minimally improves, or doesn't improve. Finally, when its action is applying brakes in time, then it reaches a reward for successfully stopping at the red signal. It retraces its actions and readjusts the reward, i.e., the value function of each state-action pair based on how close it got the agent to the final goal of stopping the vehicle. In the next scenario, the learning agent has a better understanding of which actions to take given each state. It gradually, over time, adjusts the policy until it converges to an optimal solution.

Value-based algorithms: Value-based functions learn to evaluate the value of states and actions. Value-based functions help the learning agent evaluate the possible future return on the current state and actions. There are two variations to value-based functions, Q-values, and V-values. Q functions estimate the expected return on state-action pairs while V functions only estimate the value of states.

Model-based algorithms: Model-based algorithms try to predict the state of the environment given the current state and action. Model-based reinforcement learning allows the agent to simulate different trajectories before taking any action. Model-based approaches provide the agent with foresight and reduce the need for gathering data by experience.

Combined methods: This method combines elements of different types of learning functions. For example, Actor-Critic algorithms combine the strengths of policy-based and value-based functions. These algorithms use feedback from a value function (the critic) to steer the policy learner (the actor) in the right direction, which results in a more sample-efficient system, wherein sample-efficiency is measured by the amount of labeled data required by an algorithm to learn.

In an embodiment, the learning agent of the global governance module can use one of the policy-based, value-based, model-based, or mixed algorithms in its learning agent.

Figure 4:
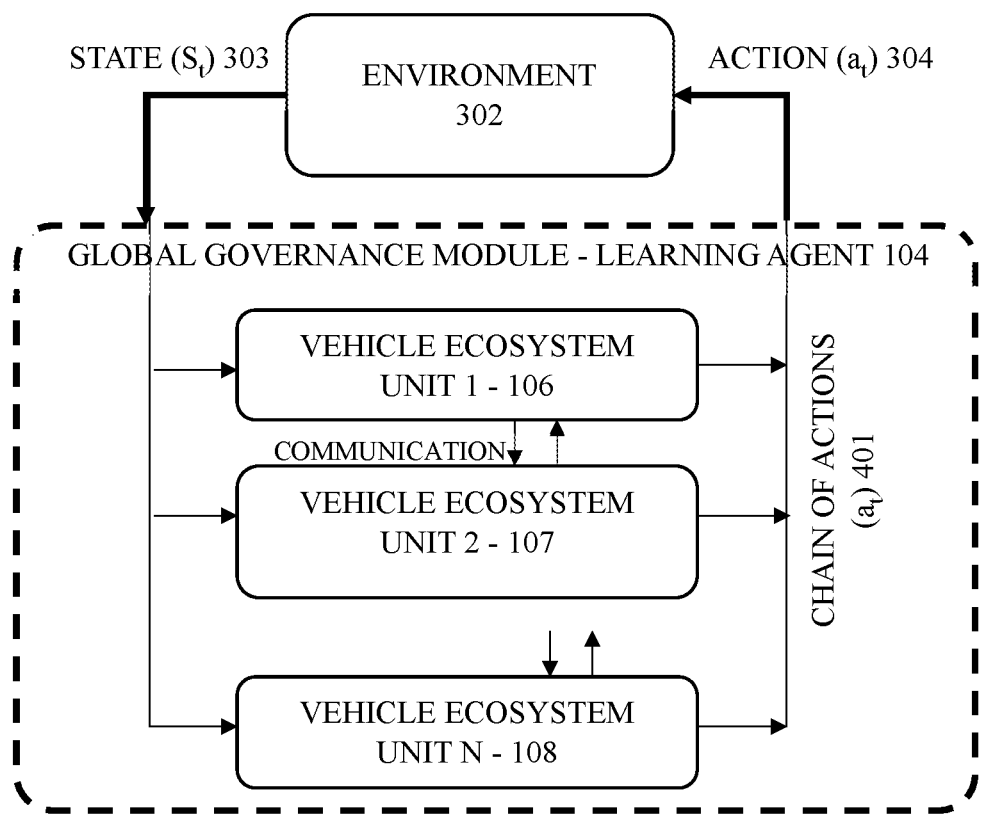
FIG. 4 shows the learning agent and environment interacting in the vehicle ecosystem according to an embodiment of the disclosure.

FIG. 4 shows the agent environment interaction in a vehicle ecosystem. According to an embodiment, the learning agent 104 interacts with the environment and orchestrates the communication between various vehicle ecosystem modules or vehicle ecosystem units. System may be performing an action 304 comprising a chain of actions 401 from various vehicle ecosystem units leading to aggregated action on the system.

Functions of a global governance module along with its communication system comprises:
(a) Orchestration and mediation of action messages between various systems based on their state function.
(b) Registering for a new system.
(c) Deregistering of the system.
(d) Threat perception and detection.

According to an embodiment, a target system Tx, which is a first vehicle ecosystem unit, communicates with another target system Ty, which is a second vehicle ecosystem unit. However, initial registration, scanning, negotiation happens via a governance module comprising a communication unit. Over a period, with a number of iterations, it builds a global environment matrix with a system, state and action type, value function based on transaction history. Considering the governance module as a system Ti, a set of acceptable states and value functions are defined.

In an embodiment, the framework comprises multiple learning agents, each focusing on a different aspect of a task. Each vehicle ecosystem module/unit can be an agent. Each agent has its own reward function, which specifies its learning objective. For example, in avoiding a collision with an obstacle, one agent, say steering system, could be concerned with the obstacle avoidance, another agent, say speed control system, could be concerned with driving speed, and another agent, braking system, could be on braking. If an obstacle is hit, the agents that are responsible for obstacle avoidance receive a negative reward of different magnitudes and those systems which are not responsible would not receive any change in their reward. In an embodiment, multiple agents can act in parallel.

Figure 5A:
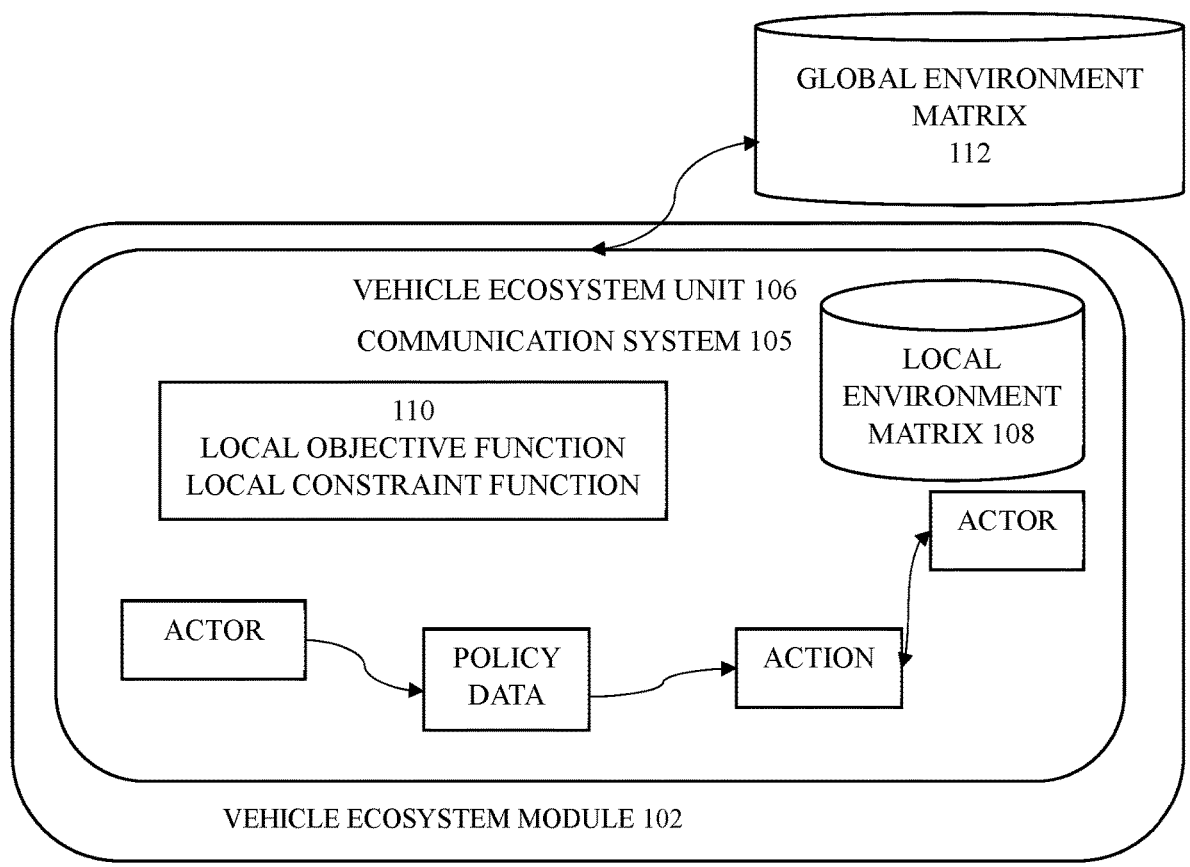
FIG. 5A shows the vehicle ecosystem module according to an embodiment of the disclosure.

Vehicle Ecosystem Module, Local Environment Matrix and Global Governance Module, Global Environment Matrix FIG. 5A and FIG. 5B show the vehicle ecosystem module and local environment matrix details according to an embodiment. As shown in FIG. 5A, a vehicle ecosystem module 102 comprises a communication system 105 and a first vehicle ecosystem unit 106 comprising a local environment matrix 108, a local objective function and a local constraint function 110. It further comprises actor, policy data, action.

According to an embodiment, as shown in FIG. 5B each vehicle ecosystem unit 106 comprises a local environment matrix which comprises a list of resources, actions matrix and respective policy and value function.

According to an embodiment, the local environment matrix comprises a state, a plurality of resources, a local objective function, a local constraint function, a policy function comprising a policy function with a policy learning agent, and a value function to generate an outcome based on a context, wherein the plurality of resources comprises any vehicle ecosystem unit upon which an action is taken. Using governance structure and communication subsystem each VEU synchronizes the latest information with regards to the local environment matrix. Upon each state of the actor, based on state-value function and objective function, each actor communicates with relevant actors and invokes appropriate action to align with the policy function which meets the local objective function and the global objective function.

Any communicating subsystem inside or outside a vehicle is considered as an Actor or VEU. Vehicle has a communication device to connect to the cloud, for example a Telematics and Connectivity Antennae Module (TCAM), shall be called an actor/VEU. Cloud endpoint shall also be an actor/VEU and some more examples, road infrastructure, other vehicles connectivity module, charging infrastructure system, emergency control room, city traffic system and any other relevant Electronic Control Unit (ECU) within the or a vehicle subsystem.

According to an embodiment, a second communication system of the global governance module connects to a cloud, wherein the cloud comprises one of a telematics and connectivity antennae module (TCAM), road infrastructure system, other vehicle connectivity module, charging infrastructure system, emergency control room, city traffic system, any other relevant, ECU within vehicle subsystem.

According to an embodiment, the second communication system of the global governance module comprises a receiver and a transmitter.

Vehicle ecosystem module updates local environment matrix from global governance module.

According to an embodiment, a vehicle ecosystem module is configured to communicate with the global governance module to synchronize the local environment matrix.

According to an embodiment, the frequency with which VEU feeds back the information to global governance module and fetches the latest information is either stochastic meaning adaptive or deterministic meaning configurable to a constant value or dynamic meaning based on a scenario and necessity within the scenario.

Figure 5C:
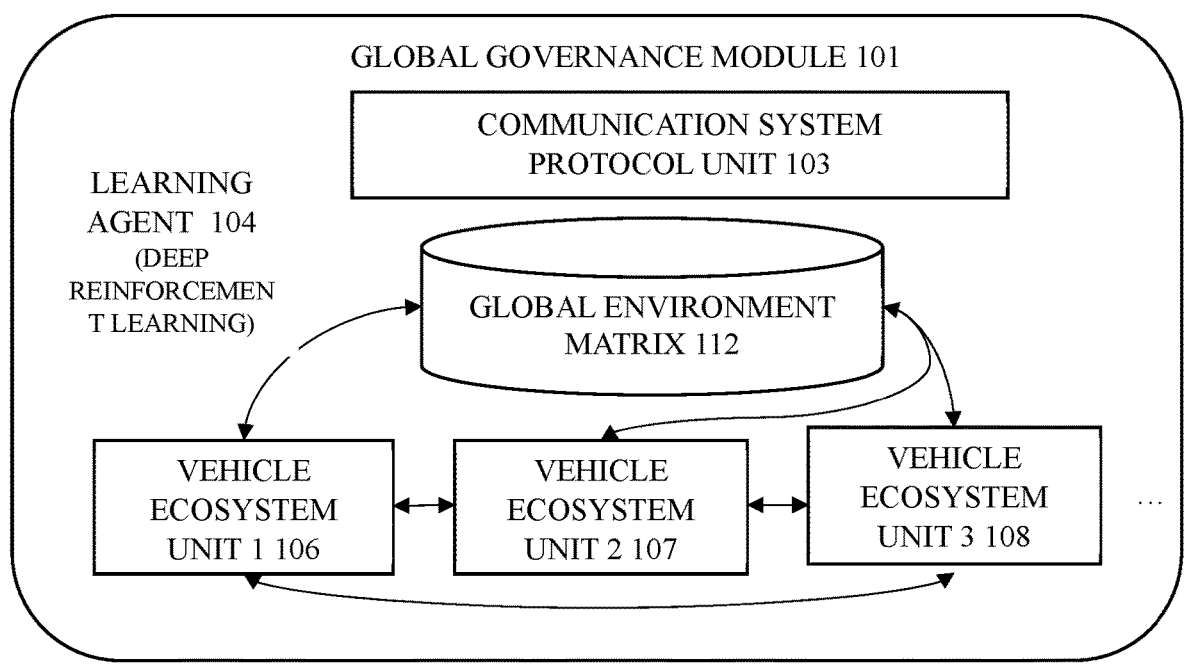
FIG. 5C shows the global governance module according to an embodiment of the disclosure.

FIG. 5C and FIG. 5D show the global governance module and global environment matrix details according to an embodiment. As shown in FIG. 5C, a global governance module 101 may be internal or external to the system. The global governance module comprises a communication system, a protocol unit 103 and a learning agent 104. In an embodiment, the communication unit comprises the learning agent. In another embodiment, the protocol unit comprises the learning agent. Global governance module comprises a first vehicle ecosystem unit 106, a second vehicle ecosystem unit 107, a third vehicle ecosystem unit 108 and so on, and are either individually or grouped into various vehicle ecosystem modules. The system is configured for autonomous communication between the vehicle ecosystem module and a global governance module. The global governance module comprising the learning agent 104 comprises deep reinforcement learning module and is configured to learn continuously and update rules for an outcome of the first vehicle ecosystem module when power in the vehicle is turned on. Global governance module facilitates communication between any two vehicle system modules or vehicle ecosystem units and between a vehicle ecosystem module and a global governance module.

In an embodiment, the communication between the first vehicle ecosystem unit and the second vehicle ecosystem unit is configured to invoke the outcome to align a policy function which meets a local objective function and a global objective function. The learning agent is configured to learn continuously based on a policy and a value function of the global governance module.

According to an embodiment, a global governance module interacts with a first vehicle ecosystem module and a cloud and determines a context from a scenario.

According to an embodiment, the global governance module orchestrates the communication between the first vehicle ecosystem unit and the second vehicle ecosystem unit and defines the rules and sequencing of the communication between the first vehicle ecosystem unit and the second vehicle ecosystem unit.

According to an embodiment, the global governance module is configured to register a new vehicle ecosystem unit.

According to an embodiment, the global governance module is configured to de-register a new vehicle ecosystem unit.

According to an embodiment, the global governance module is configured to perceive and detect a threat.

The learning agent 104 comprises a deep reinforcement learning module to assess a scenario, wherein the system is configured to enable a function in an autonomous mode optionally without a rule-based system.

According to an embodiment, assessing a scenario comprises analyzing the outcome which comprises actions that when taken by a system transform the system in a current state to a next state. State of a system is not a discrete entity, rather a spectrum or a continuous function. In general, a system moves from a low valued end of spectrum state towards high valued end of spectrum state by choosing the right action type. A function represents any kind of systemic transaction which takes place between the systems and modifies the predefined state(s).

According to an embodiment, the global governance module comprises a global environment matrix comprising a plurality of target systems, a global policy function, and a global value function, a state catalogue, a communication catalogue, a global objective function and a global constraint function.

According to an embodiment, the policy function comprising the learning agent and the value function are customizable and are configurable by an original equipment manufacturer according to an embodiment.

According to an embodiment, the learning agent comprising the deep reinforcement learning module learns how to reach global objective function by mapping states and actions to an outcome.

According to an embodiment, the action changes the current state of the vehicle to a new state of the vehicle. The learning agent updates rules based on feedback from the outcome of the system. The updating of rules for the protocol is based on continuous learning.

Global environment matrix as shown in FIG. 5D comprises action type, policy update, value function, state catalogue and communication catalogue corresponding to each of the target systems. Target systems are the vehicle ecosystem units which include actors and resources. An actor is a vehicle ecosystem unit which performs an action whereas a resource is a vehicle ecosystem unit on which the action is performed.

Action type refers to the type of the action that is being performed. These are variables that can be defined by the system based on the experience, historic data or can be pre-coded into the system.

An application of policy evaluation followed by application of policy improvement is referred to as a policy update. Given an arbitrary initial policy, successive policy updates give rise to a sequence of improving policies that will eventually reach an optimal policy.

A value function of a system of a unit is defined as $f(x_1, x_2 \ldots x_n)$ wherein $x_1, x_2 \ldots x_n$ are independent state variables of the system or unit.

A state catalog comprises $s_1, s_2, s_3 \ldots s_n$ which are acceptable states for a system and $s_1, s_2 \ldots s_x$ are the current set of system states. Each state is expressed as a function of independent state variables $x_1, x_2, \ldots$ as $s_1(x_1, x_2 \ldots x_n)$, and $s_2(x_1, x_2 \ldots x_n)$ and so forth for each of the target systems. $s_1, s_2, s_3 \ldots s_n$ are used to compute the value function.

Communication catalogue refers to a list of supported communication protocols by each of the target systems.

State-Value matrix. A system can have multiple value functions and each value function is governed by multiple states. In an embodiment, system refers to a vehicle ecosystem unit or a vehicle gateway unit within a vehicle. However, Original Equipment Manufacturers (OEMs) can define and customize any number of independent systems within a vehicle.

An example state value matrix is shown in FIG. 6. Value functions are expressed as V1, V2, V3 wherein, (a) V1 is expressed as a function of $g_1(f_1(W_1*X_1), f_2(W_2*X_2) \ldots f_n(W_n*X_n))$ (b) V2 is expressed as a function of $g_2(f_1(W_1*X_1), f_2(W_2*X_2) \ldots f_n(W_n*X_n))$ (c) Vn is expressed as a function of $g_n(f_1(W_1*X_1), f_2(W_2*X_2) \ldots f_n(W_n*X_n))$ wherein W1, W2 ... Wn are weights corresponding to respective states S1, S2 ... Sn and X1, X2 ... Xn are bias values towards the state while determining the value functions for state S1, S2, ... Sn. V1, V2 ... Vn are value functions and g1, g2 ... gn are composite functions of the constituent functions such as f1, f2 ... fn. which computes the active states relevant to the value function.

State-Transition Matrix: State transition matrix visualizes transition between states with acceptable sets of action types. A system can be in multiple states at the same time. At any given time, the system wants to increase the value from its value function, either short-term or long-term, it strives to move to high valued states using various action types. If the particular action type is executed on a target system and the target system responds back, the source system state moves from S1 to Sx. A state transition matrix is as shown in FIG. 7 according to an embodiment.

System-State-Action Type Matrix: Value function is computed using a state-value matrix and a state transition matrix. Each state is governed by a set of variables which defines the intensity of the state as a spectrum. State-transition matrix contains information about the kind of action types required to achieve state transition. In another catalog, target system-state-action type matrix as shown in FIG. 8 in conjunction with state-transition matrix as shown in FIG. 7 helps the system to maximize the system's long term value by choosing the right state transition with corresponding action type and target system to perform the action. According to an embodiment, dependencies, mutual exclusivity between states are taken care of in the system.

System policy functions: Each vehicle ecosystem unit which is a target unit for the global governance module denoted as Ti has a set of policy functions P1, P2 . . . Pn which influence the state-action type selection process in order to maximize the value.

Action generation mechanics: Action content template is unique to every action type and content is generated based on variables defined by the action type. Each action is represented by
  (a) A1=A1(x1, x2 . . . xn)
  (b) A2=A2(x1, x2 . . . xn) . . .
  (c) An=An(x1, x2 . . . xn)

The environment matrix and functions that are used to generate and compute action will be housed in each vehicle ecosystem unit towards application of the system in various scenarios.

Message synthesis mechanics: One of the action variables is the choice of communication protocol for a given layer which must be supported by target system Ti. A common content generation system for each protocol/layer based on the protocol syntax and message content controlled by a set of action variables.

Since the application layer protocols are MQTT, AMQP, STOMP, etc., there are two variants that are developed for communication between any two systems which do not agree on a protocol.

Figure 9:
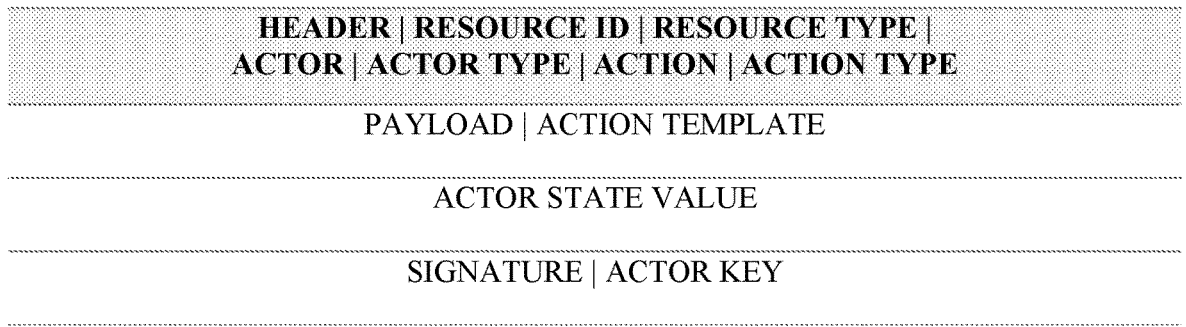
FIG. 9 shows a protocol message structure comprising a payload content defined by the templated content based on action type according to an embodiment.

In an embodiment, a payload content is defined by the templated content based on action type as shown in FIG. 9. The variables in the template are replaced by values of action variables and state variables. In an example, a vehicle gateway unit, a first vehicle ecosystem unit, requests charging infrastructure, a second vehicle ecosystem unit, for details and intention to charge. In an embodiment, the charging infrastructure system would likely furnish charging capacity, wait time at the station, current queue size, charging rate are some of the variables. These variables will be filled up in a template as shown in FIG. 9. Depending on the protocol of the target systems, vehicle gateway unit which comprises a first vehicle ecosystem unit and charging infrastructure which comprises a second vehicle ecosystem unit, a respective application layer protocol payload will be generated using the templated content.

An outcome of the second vehicle ecosystem unit, i.e., charging infrastructure may provide a message according to an embodiment as "Please find charging infrastructure values as <A1>, <A2>, <An>," wherein A1, A2 . . . An, will be filled with actual values based on the current state of the charging infrastructure system.

In another embodiment, a payload content generation may be based on predefined meta structure and actual content is based on the content of requested payload. In an embodiment, a pretrained model based on a machine learning technique Natural Language Processing-Bidirectional Encoder Representations from Transformers (NLP-BERT), Generative Pre-trained Transformer 2 (GPT2), Generative Pre-trained Transformer 3 (GPT3) techniques generate the response based on the content of request payload. An extensive scenario-based training dataset will be used to produce a highly accurate trained model. In an embodiment, OEMs or implementation vendors can choose a suitable variant depending on the scenarios and implementation strategies.

According to an embodiment, the protocol unit comprises a payload content, wherein variables of a predefined message template of the payload content are filled by values of action variables and state variables.

According to an embodiment, the protocol unit comprises the predefined message template comprises a message structure comprising a header, a resource, a resource type, an actor, an actor type, an action, an action type, a payload comprising an action template, an actor state value, a signature comprising actor key, wherein the actor is the first vehicle ecosystem unit performing the outcome and the resource is a first vehicle ecosystem unit on which the outcome is performed.

According to an embodiment, the protocol unit comprises a predefined meta structure wherein, an actual message content depends on a request content payload. In an embodiment, the protocol unit comprises a pretrained model based on NLP-BERT, GPT2, GPT3 techniques generate a response based on the request content payload.

In an embodiment, the protocol unit comprises a message superstructure to accommodate any sub protocol structure comprising AMQP, MQTT, STOMP, Zigbee, UDS, ODX, DoIP, and OBD.

In an embodiment, a value function is defined by a few sets of parameters including but not limited to efficiency of transactions between systems, stability of systems under governance, time to resolve systems from unstable to stable states, number of registering and deregistering of systems, number of systems governed, etc.

According to an embodiment, policy functions influence the behavior of the systems being governed. In an embodiment, these include, but not limited to, energy efficiency of the system, low memory and latency transactions.

Based on the policy and value function, the learning agent of the global governance module communicates, learns and improves over multiple iterations. In an embodiment, a pre-trained learning model can be deployed with any value and policy functions to the existing governance module comprising a communication system. In an embodiment, the learning agent of the global governance module comprises value and policy functions which are built based on mediation between the target systems and their transactions.

According to an embodiment, the learning agent learns continuously based on a policy function and value function of the global governance module.

According to an embodiment, the global governance module is in the cloud and the vehicle gateway system connects with it through geo-fencing mechanism, meaning depending on the car or vehicle location, the respective regional governance module takes control.

According to another embodiment, the regional governance module could be an intermediate to the vehicle ecosystem module and the global governance module. In an embodiment, the system may comprise a regional governance module as an intermediate to the vehicle ecosystem module and the global governance module.

Vehicle ecosystem units within a vehicle ecosystem module or outside of the vehicle ecosystem module communicate with each other. Initial negotiation between ecosystem units happens through the global governance module. Later, according to an embodiment, each ecosystem unit may interact directly while details of the transactions are fed back to the global governance module.

An embodiment relates to a method comprising the steps of, receiving communication from a first vehicle ecosystem module comprising a first vehicle ecosystem unit and a first communication system comprising a local environment matrix, assessing a scenario by a learning agent comprising a deep reinforcement learning module of a global governance module, dynamic synchronization of a local environment matrix of a first vehicle ecosystem module by communicating with the global governance module, determining an outcome of the first vehicle ecosystem unit based on a decision made by the learning agent, wherein the learning agent is configured to learn continuously and updates rules for an outcome of the vehicle when power in the vehicle is turned on and executing the outcome, wherein the method is configured for autonomous communication between the first vehicle ecosystem module and the global governance module, wherein the method is configured to enable a function in an autonomous mode optionally without a rule-based system, wherein the rule-based system does not include the learning agent, wherein optionally there is no fixed protocol for a communication between the first vehicle ecosystem unit and a second vehicle ecosystem unit, such that the communication between the first vehicle ecosystem unit and the second vehicle ecosystem unit is independent of a fixed protocol and the first vehicle ecosystem unit and the second vehicle ecosystem unit communicate even if the first vehicle ecosystem unit and the second vehicle ecosystem unit have not agreed to a protocol before the communication and wherein an outcome of the first vehicle ecosystem unit is determined based on a decision made by the learning agent.

According to an embodiment, the method is executed on a non-transitory computer-readable medium having stored thereon instructions executable by a computer system.

In an embodiment, a few scenarios along with vehicle ecosystem units, their setup and values have been discussed. Original equipment manufacturers or solution implementers can define and customize system boundaries, VEU boundaries, state value matrix, action types and value system. An objective is to create homeostasis in the vehicle ecosystem. Just like living organisms find mechanisms to stay in steady state, vehicle ecosystem units coordinate and maintain a steady state.

According to an embodiment, a state value matrix is defined as shown in FIG. 10. Example state functions are defined as medical emergency, vehicle emergency, route accuracy, traffic accuracy, service assistance, fuel efficiency, passenger comfort, fuel level, driver assistance, road assistance, weather assistance, transport assistance, parking assistance, fleet mode, etc. According to an embodiment, three different value functions which are efficiency value function, safety value function and comfort value function are defined using each of the state functions mentioned.

A state function is computed as shown in FIG. 11. For example, considering the action type SOS alert and the vehicle alert, a function S1 using the variables passenger health, collision, vehicle distortion, etc., from the alert message determines if it is a medical emergency or a vehicle emergency. A system-state-action transition matrix as shown FIG. 12, FIG. 13, FIG. 14, and FIG. 15 is comprised in the global governance module and a local replica will be available in each of the target systems i.e., vehicle ecosystem module or vehicle ecosystem units. Each state above is a function of dependent variables. Hence, it is a spectrum with continuous state rather than discrete state.

Scenario 1: According to an embodiment, the scenario comprises a first vehicle ecosystem unit, vehicle A communicating with a second vehicle ecosystem unit, a cloud unit, to identify an available set of vehicles within a city or a regional limit for a specified amount of time so that the first vehicle ecosystem unit, vehicle A, can download traffic policy data, driver assistance data from a third vehicle ecosystem unit, which is vehicle B upon approval.

Vehicle A gateway system comprising a "traffic_accuracy" value function reduces in value. This triggers an action type associated with the "traffic_accuracy" state function namely "traffic_search," "traffic_update." Searches for a target system which provides or accepts the above action types and state through the global governance module may return vehicle B and vehicle C as a result. Global governance module negotiates and establishes connection between vehicle A and vehicle B. Vehicle A through its gateway system requests the "traffic_info" and "traffic_update" from vehicle B through the established connection. "Traffic_accuracy" state is re-estimated and "traffic_accuracy" value function restores back to normal. Vehicle B through its gateway system sends "traffic_info" and "traffic_update" to vehicle A. Vehicle A, vehicle B, and vehicle C are vehicle ecosystem units communicating through their gateway systems via global governance module. If such a global governance module was not there to navigate, the communication would not have happened between vehicle A, vehicle B and vehicle C if their communication protocols did not agree with each other.

Scenario 2: A first vehicle ecosystem unit, vehicle A, communicates with a transport and road infrastructure systems to fetch upfront information for a given set of destinations and routes, wherein the upfront information comprises tolls, road infrastructure quality, possible number of public transports interventions comprising trams, buses, trains, and construction work, etc. The upfront information of the scenario comprises both qualitative and quantitative data.

Vehicle A through its gateway system, finds that "passenger comfort" value function, "safety" value function is degrading and triggers vehicle A to pick or look for the states contributing to the decrease in value, namely "road_assistance," "transport_assistance" and "route_assistance." Vehicle A sends the state and respective action types to the global governance module, requesting appropriate target systems. Upon receiving the target systems and details from the global governance module, vehicle A starts negotiations with respective systems and sends "action type" requests with respective state functions. Upon receiving updates from respective systems, "action_type" restores the states back to normal and the "passenger_comfort" and "safety_value" functions start improving based on re-estimation and outcomes.

Global governance module receives request from vehicle A to identify target systems and responds with a list of target systems like road infrastructure, traffic control system.

Road infrastructure system receives request from vehicle A and responds with road information updates.

Traffic control system receives request from vehicle A and responds with traffic information updates.

Scenario 3: A first vehicle ecosystem unit, vehicle A communicates with a local weather system to fetch early near accurate weather for a given destination and routes. The first vehicle ecosystem unit communicates with a road lighting system with a given destination and routes to fetch quantitative and qualitative data which provide better insights into decision making. The first vehicle ecosystem unit communicates with a parking system to find an available parking space for a given set of destination routes and enroute itinerary comprising shopping, food, and recreation.

Vehicle A, through its gateway system, finds that "passenger_comfort" and "safety" value functions degrade value due to state functions "weather_assistance" state, "road_assistance" state, and "parking_assistant." It sends requests to the global governance module to find target systems which can act on degraded state functions and action types. It sends action type requests to the target systems suggested by the global governance module and reevaluates the state functions upon receiving the responses from those systems.

Global governance module receives request from vehicle A to identify target systems and responds with a list of target systems like weather systems, road infrastructure, parking system.

Weather system receives action type request from vehicle A and responds back with information or confirmation of action.

Road lighting system receives information from vehicle A regarding lighting assets and quality and responds back with details or confirmation of repair activity.

Parking system receives action type request from vehicle A and responds back with parking capacity, time, charges, and confirmation of action.

Scenario 4: A first vehicle ecosystem unit communicating with a charging infrastructure to fetch availability of charging slots, charging speed and range. In case of issues with a charging infrastructure, the first vehicle ecosystem unit alerts a charging central system regarding a malfunctioning of charging station and sends diagnostics data from the charging infrastructure.

Vehicle A, through its gateway system, finds that the fuel value function degrades due to the fuel state function which triggers the respective action type. Vehicle A sends requests to the global governance module for the target system supporting respective state and action functions. After receiving the response from the global governance module, vehicle A sends requests to the charging infrastructure systems to get more information and schedule a charging slot. Based on the response from charging infrastructure, it updates the state functions and re-evaluates the value functions appropriately. If the response is negative, vehicle A sends further requests to the charging central gateway to report the state, action type and state of charging infrastructure. Upon receiving a response from the charging central gateway, the system updates the state function and value function.

Charging infrastructure, after receiving a request from vehicle A, responds appropriately with charging infrastructure details.

Global governance module, receives the request and provides the list of charging infrastructure and central gateway systems to vehicle A.

Charging central gateway, upon receiving request from vehicle A, responds back with confirmation of action taken or scheduled action on infrastructure.

Scenario 5: A first vehicle ecosystem unit, vehicle A comprising a gateway unit uses a location-based system to send emergency alerts to enroute towards a mobile vehicle service system. The mobile vehicle service system that is either semi-autonomous or autonomous is configured to run regular diagnostics troubleshooting against the first vehicle ecosystem unit and is configured to perform service and replacement when possible or configured to establish a connect to emergency support system to tow the vehicle to the nearest service station.

Vehicle A, through its gateway system, finds "safety" and "comfort" value functions degrading or degraded due to service request or vehicle emergency state functions degrading or degraded. It sends requests to the global governance module with state and action types to find a target system to carry out the action types. Vehicle A sends a request to the respective mobile vehicle service system for information or scheduler service request. Upon receiving the response, the system updates the state and re-evaluates the value functions.

Mobile vehicle service system responds with information and available schedule and confirms the schedule.

Global governance module, responds back with nearest possible mobile service systems Scenario 6: A first vehicle ecosystem unit communicating with a city information center helps it to navigate and to fetch the latest relevant update about city or region of relevance, wherein the latest relevant update includes quantitative or qualitative data comprising public event in particular location, traffic congestion, traffic routing due to rain, new policies or laws, any attacks, or accidents in other parts of the region. The first vehicle ecosystem unit is configured to operate in tandem with a location-based system to triangulate quantitative or qualitative data.

Vehicle A, through its gateway system, finds that "safety" and "comfort" value functions degrading or degraded due to "service request" or "vehicle emergency" state functions degrading or degraded. It sends requests to the global governance module with state and action types to find a target system to carry out the action types. Vehicle A sends a request to the respective mobile vehicle service system request information or scheduler service request. Upon receiving the response, the system updates the state and reevaluates the value functions.

Mobile vehicle service system responds with information and available schedule and confirms the schedule.

Global governance module responds back with nearest possible mobile service systems.

Scenario 7: A first vehicle ecosystem unit, vehicle A, communicates with a public transport system and a traffic control system to fetch a data comprising near real time traffic congestion in major highways, motorways and historical traffic profile and model, wherein the data helps vehicle to make accurate decision with regards to route identification given a destination.

Vehicle A, through its gateway system, finds that "comfort" and "traffic" value function are degrading or degraded due to major traffic congestion in a particular route. Vehicle A sends respective state functions "traffic_accuracy," "route_accuracy" and action type to the global governance module. Vehicle A sends respective state functions and action type requests to the target system which is a traffic control system. Upon receiving the information from the target system, vehicle A updates the state functions and re-evaluates the traffic and comfort value functions over a period of time.

Traffic control system responds back with traffic profile and historical traffic models for the given areas.

Global governance module, upon receiving the request from vehicle A, responds back with target systems like traffic control systems.

Scenario 8: A first vehicle ecosystem unit, vehicle A, encounters an emergency comprising a passenger emergency, wherein the first vehicle ecosystem unit communicates with the ambulance vehicle system with regards to more details about passenger quantitative and qualitative data. The first vehicle ecosystem unit encounters an emergency comprising a vehicle emergency, wherein the first vehicle ecosystem unit sends and receives vehicle diagnostics information to vehicle emergency services to route mobile service stations. The scenario comprises the first vehicle ecosystem unit encounters an emergency wherein a first vehicle ecosystem unit communicates with a second vehicle ecosystem unit for possible assistance. The scenario comprises the first vehicle ecosystem unit encounters an emergency then a quantitative and a qualitative data is shared with an auto insurance system, to avail insurance benefits and adjusts a premium.

Vehicle A encounters an emergency and passenger emergency system communicates with an ambulance vehicle system with regards to more details about passenger quantitative and qualitative data. Vehicle emergency system sends and receives vehicle diagnostics information to vehicle emergency services to route mobile service stations. Vehicle A communicates with vehicle B for possible assistance in the event of an emergency. Also, quantitative, and qualitative data shared with the auto insurance system, to avail insurance benefits and adjust the premium.

Vehicle A through its gateway system, finds that a vehicle accident caused damage to vehicle and "vehicle safety," "vehicle comfort," "passenger safety," and "passenger comfort" value functions degrade drastically due to decrease in "vehicle emergency," "passenger emergency" state functions. It sends requests to the global governance module with respective action types. Upon receiving response from the global governance module, it sends requests to appropriate target systems such as emergency systems with respective state functions and action types. Upon receiving the response from respective target systems, it updates the state functions and re-evaluates the respective value functions in a continuous manner until the safety value function is above the threshold.

Global governance module responds back with respective target systems based on appropriate state functions and action types.

Vehicle B though its gateway system, upon receiving the information, forwards to other known vehicle nodes or responds with a schedule of arrival.

Vehicle emergency system, upon receiving request, responds with information update and arrival schedule.

Medical emergency system, upon receiving request, responds with acknowledgement and schedules an ambulance vehicle to the spot if needed or mobile medical emergency vehicle.

Scenario 9: A first vehicle ecosystem unit, vehicle A, when the owner has enabled fleet mode for additional revenue communicates with a fleet management system. With the help of a location-based system, a fleet management system triangulates a location or a position of the first vehicle ecosystem unit and confirms the location with help of a second vehicle ecosystem unit, vehicle B, which is part of a fleet. The fleet mode remains until the owner decides to withdraw based on a policy function.

Vehicle A through its gateway system, finds vehicle A, with fleet mode turned on, the "fleet efficiency" value functions have low values and respective "fleet_mode" state functions have low values. It triggers vehicle A to send state functions and respective action types to the global governance module to fetch the target system. Vehicle A sends requests with state functions and action type to respective target systems, fleet management systems to some of the fleet located closely. With information from fleet management and vehicle B systems, it updates the respective state functions based on outcome and reevaluates the value function.

Fleet management system, upon receiving request for registration/deregistration, system responds back based on state of fleet.

Vehicle B, through its gateway system, upon receiving a request for cluster registration/deregistration, responds back appropriately.

Global governance module responds back with target system information such as fleet management system and other vehicles, vehicle B in this case, registered in fleet mode.

What is claimed is:

1. A system comprising:
a first vehicle ecosystem module, wherein the first vehicle ecosystem module comprises a processor, a memory, a first communication system, and a first vehicle ecosystem unit, wherein the first vehicle ecosystem unit comprises a local environment matrix, wherein the local environment matrix comprises a local objective function, information related to an environment of the system, and information related to the first vehicle ecosystem unit stored to a first database; and
a global governance module comprising a global environment matrix, a learning agent powered by a machine learning technique, and a second communication system comprising a protocol unit, wherein the protocol unit comprises a predefined meta structure configured for generating a payload content, wherein the system is configured for autonomous communication between the first vehicle ecosystem module and the global governance module that is internal to the system, and wherein the global environment matrix comprises information related to a plurality of vehicle ecosystem units, a global objective function, and a communication catalogue corresponding to each of the plurality of vehicle ecosystem units stored to a second database;
wherein the system is configured for autonomous communication, wherein the global governance module, via the protocol unit, orchestrates the autonomous communication between the first vehicle ecosystem unit using a first communication protocol and a second vehicle ecosystem unit using a second communication protocol;
wherein the learning agent comprises a deep reinforcement learning module to assess a scenario, wherein an outcome of the first vehicle ecosystem unit is determined based on a decision made by picking the outcome from all possible outcomes after assessing the scenario with the learning agent, wherein the learning agent learns continuously and updates rules based on feedback from the outcome, and by receiving a reward based on a relevance of the outcome to the local objective function and the global objective function; and
wherein the system is configured to enable a function to modify a state of the first vehicle ecosystem unit in an autonomous mode;
wherein communication between the first vehicle ecosystem unit and the second vehicle ecosystem unit is independent of a fixed protocol; and
wherein the first vehicle ecosystem unit which is in a first vehicle is configured for autonomously communicating with the second vehicle ecosystem unit which is in at least one of a second vehicle and an infrastructure unit in the scenario.

2. The system of claim 1, wherein the first vehicle ecosystem module is based on a functional boundary, wherein the first vehicle ecosystem module comprises vehicle ecosystem units grouped by function.

3. The system of claim 1, wherein the first vehicle ecosystem module is based on a structural boundary, wherein the first vehicle ecosystem module comprises one of road infrastructure system, cloud system, and vehicle subsystem further comprising a powertrain system, a steering system, a suspension system, a fuel injection system, a braking system, and a communication system.

4. The system of claim 1, wherein the first vehicle ecosystem module is configured to communicate with the global governance module to synchronize the local environment matrix.

5. The system of claim 1, wherein the local environment matrix comprises a state, a plurality of resources, the local objective function, a local constraint function, a policy function, and a value function to generate the outcome based on a context from the scenario, wherein the resources comprises any vehicle ecosystem unit upon which an action is taken.

6. The system of claim 1, wherein the global environment matrix comprises a plurality of target systems, a global policy function, and a global value function, a state catalogue, the communication catalogue, the global objective function and a global constraint function.

7. The system of claim 1, wherein the deep reinforcement learning module comprises at least one of a dynamic programming, Monte Carlo, temporal-difference, Q-learning, Sarsa, R-learning and function approximation methods.

8. The system of claim 1, wherein the second communication system of the global governance module connects to a cloud, wherein the cloud comprises one of a telematics and connectivity antennae module, road infrastructure system, charging infrastructure system, vehicle emergency services, city traffic system, and a vehicle subsystem.

9. The system of claim 1, wherein the global governance module interacts with the first vehicle ecosystem module and a cloud and determines a context from the scenario.

10. The system of claim 1, wherein the scenario comprises one of a traffic update, a routing information, a weather update, a charging infrastructure details and scheduling, an emergency, a public event disrupting traffic and routing, a routing to a destination, a passenger emergency, and a location update.

11. The system of claim 1, wherein the global governance module is configured to register and to deregister a new vehicle ecosystem unit.

12. The system of claim 1, wherein the global governance module defines sequencing of communication between the first vehicle ecosystem unit and the second vehicle ecosystem unit.

13. The system of claim 1, wherein a predefined message template of the payload content are filled by values of action variables and state variables, wherein the predefined message template comprises a message structure comprising a header, a resource, a resource type, an actor, an actor type, an action, an action type, a payload comprising an action template, an actor state value, a signature comprising actor key, wherein the actor is the first vehicle ecosystem unit performing the outcome and the resource is the first vehicle ecosystem unit on which the outcome is performed.

14. The system of claim 1, wherein an actual message content depends on a request of the payload content.

15. The system of claim 1, wherein the predefined meta structure comprises a message superstructure to accommodate a sub protocol structure, wherein the sub protocol structure is one of AMQP, MQTT, STOMP, Zigbee, UDS, ODX, DoIP, and OBD.

16. The system of claim 1, wherein the rules of the learning agent are updated based on a global policy function and a global value function of the global governance module.

17. The system of claim 1, wherein the outcome is an action and is based on a state-value function and the local objective function, wherein the action changes a current state of the first vehicle to a new state of the first vehicle.

18. The system of claim 1, wherein communication between the first vehicle ecosystem unit and the second vehicle ecosystem unit is configured to invoke the outcome to align a policy function which meets the local objective function and the global objective function.

19. A system, comprising:
a first vehicle ecosystem module, wherein the first vehicle ecosystem module comprises a processor, a memory, a first communication system, and a first vehicle ecosystem unit, wherein the first vehicle ecosystem unit comprises a local environment matrix, wherein the local environment matrix comprises a local objective function, information related to an environment of the system, and information related to the first vehicle ecosystem unit stored to a first database; and
a global governance module comprising a global environment matrix, a learning agent powered by a machine learning technique and a second communication system comprising a protocol unit, wherein the protocol unit comprises a predefined meta structure configured for generating a payload content, wherein the system is configured for autonomous communication between the first vehicle ecosystem module and the global governance module that is external to the system, and wherein the global environment matrix comprises information related to a plurality of vehicle ecosystem units, a global objective function, and a communication catalogue corresponding to each of the plurality of vehicle ecosystem units stored to a second database;
wherein the system is configured for autonomous communication, wherein the global governance module, via the protocol unit, orchestrates the autonomous communication between the first vehicle ecosystem unit using a first communication protocol and a second vehicle ecosystem unit using a second communication protocol;
wherein the learning agent comprises a deep reinforcement learning module to assess a scenario, wherein an outcome of the first vehicle ecosystem unit is determined based on a decision made by picking the outcome from all possible outcomes after assessing the scenario with the learning agent, wherein the learning agent learns continuously and updates rules based on feedback from the outcome, and by receiving a reward based on a relevance of the outcome to the local objective function and the global objective function; and
wherein the system is configured to enable a function to modify a state of the first vehicle ecosystem unit in an autonomous mode; and wherein a communication between the first vehicle ecosystem unit and the second vehicle ecosystem unit is independent of a fixed protocol; and wherein the first vehicle ecosystem unit which is in a first vehicle configured for autonomously communicating with the second vehicle ecosystem unit which is in at least one of a second vehicle and an infrastructure unit in the scenario.

20. A non-transitory computer-readable medium having stored thereon instructions executable by a computer system to perform a method comprising:

receiving communication from a first vehicle ecosystem module comprising a first vehicle ecosystem unit and a first communication system, wherein the first vehicle ecosystem unit comprises a local environment matrix, wherein the local environment matrix comprises a local objective function, information related to an environment, and information related to the first vehicle ecosystem unit stored to a first database;

assessing a scenario for all possible outcomes by a global governance module comprising a global environment matrix, a learning agent powered by a machine learning technique, and a second communication system, wherein the learning agent comprises a deep reinforcement learning module, and the second communication system comprises a protocol unit, wherein the protocol unit comprises a predefined meta structure configured for generating a payload content, and wherein the global environment matrix comprises information related to a plurality of vehicle ecosystem units, a global objective function, and a communication catalogue corresponding to each of the plurality of vehicle ecosystem units stored to a second database;

identifying a target system by the global governance module, wherein the target system is a second vehicle ecosystem unit;

dynamically synchronizing the local environment matrix of the first vehicle ecosystem module by communicating with the global governance module and the second vehicle ecosystem unit, wherein the global governance module via the protocol unit, orchestrates a communication between the first vehicle ecosystem unit using a first communication protocol and the second vehicle ecosystem unit is using a second communication protocol;

determining an outcome of the first vehicle ecosystem unit based on a decision made by picking the outcome from all the possible outcomes after assessing the scenario with the learning agent, wherein the learning agent is configured to learn continuously and update rules for the outcome based on feedback from the outcome, and by receiving a reward based on a relevance of the outcome to the local objective function and the global objective function and executing the outcome;

wherein the method is configured to enable a function to modify a state of the first vehicle ecosystem unit in an autonomous mode; and wherein the communication between the first vehicle ecosystem unit and the second vehicle ecosystem unit is independent of a fixed protocol; and wherein the first vehicle ecosystem unit which is in a first vehicle is configured for autonomously communicating with the second vehicle ecosystem unit which is in at least one of a second vehicle and an infrastructure unit in the scenario; and wherein the environment comprises surroundings and a space in which the first vehicle is navigating.

* * * * *